United States Patent
Liu et al.

(10) Patent No.: US 12,376,107 B2
(45) Date of Patent: Jul. 29, 2025

(54) FULL-SLOT TRANSMISSION DETECTION FOR SIDELINK COMMUNICATIONS

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 17/876,434

(22) Filed: Jul. 28, 2022

(65) Prior Publication Data

US 2024/0040567 A1    Feb. 1, 2024

(51) Int. Cl.
*H04W 72/00* (2023.01)
*H04W 72/044* (2023.01)
*H04W 72/20* (2023.01)

(52) U.S. Cl.
CPC ......... *H04W 72/20* (2023.01); *H04W 72/044* (2013.01)

(58) Field of Classification Search
None
See application file for complete search history.

(56) References Cited

U.S. PATENT DOCUMENTS

| | | | |
|---|---|---|---|
| 2021/0195560 A1* | 6/2021 | Ryu | H04B 7/0695 |
| 2021/0329596 A1* | 10/2021 | Freda | H04W 72/02 |
| 2022/0022279 A1* | 1/2022 | Kim | H04W 72/23 |
| 2022/0256525 A1* | 8/2022 | Lin | H04W 92/18 |
| 2022/0346081 A1* | 10/2022 | Luo | H04W 52/0235 |
| 2022/0377761 A1* | 11/2022 | Lee | H04W 92/18 |
| 2023/0239837 A1* | 7/2023 | Ye | H04W 76/23 370/329 |
| 2023/0262665 A1* | 8/2023 | Zhao | H04W 72/044 370/330 |
| 2024/0188153 A1* | 6/2024 | Hoang | G01S 5/0072 |
| 2024/0284440 A1* | 8/2024 | Sarkis | H04L 1/189 |
| 2024/0389113 A1* | 11/2024 | Park | H04W 72/25 |

\* cited by examiner

*Primary Examiner* — Brandon M Renner
(74) *Attorney, Agent, or Firm* — QUALCOMM Incorporated

(57) ABSTRACT

Methods, systems, and devices for wireless communication are described. Some wireless communications systems may support a slot transmission detection procedure for sidelink communications. A sidelink user equipment may monitor, during a slot and within one or more subbands, for signaling associated with a first sidelink transmission that corresponds to resources that span a duration of the slot. The signaling may include sidelink control information, a demodulation reference signal, or other sidelink signaling associated with the first sidelink transmission. The user equipment may determine a signal strength or one or more other parameters associated with the signaling. The user equipment may determine whether to transmit a second sidelink transmission having a duration that is less than a first duration of the first sidelink transmission based on the signal strength, the one or more parameters, or both associated with the signaling.

12 Claims, 17 Drawing Sheets

FULL-SLOT TRANSMISSION DETECTION FOR SIDELINK COMMUNICATIONS

FIELD OF TECHNOLOGY

The following relates to wireless communication, including full-slot transmission detection for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may transmit a sidelink message to one or more other UEs using slot-based transmissions associated with resources that span a duration of a slot, or using mini-slot-based transmissions associated with resources that have a relatively shorter duration (e.g., a portion of a slot, such as one or more symbols). The slot-based transmissions may begin after a first symbol in a slot, and the mini-slot-based transmissions may begin after the first symbol in the slot or in a symbol that is later in the slot (e.g., the middle of the slot).

SUMMARY

The present disclosure relates to methods, systems, devices, and apparatuses that support full-slot transmission detection for sidelink communications. Generally, the described techniques provide for a sidelink user equipment (UE) to perform a transmission detection procedure to determine whether to transmit a mini-slot transmission via a sidelink communication link. To perform the transmission detection procedure, the UE may monitor sidelink resources within a slot in a time domain and one or more subbands in a frequency domain for signaling associated with a first sidelink transmission that corresponds to resources that span a duration of the slot (e.g., a slot-based transmission). The signaling may include sidelink control information (SCI), a demodulation reference signal (DMRS), or other sidelink signaling associated with the first sidelink transmission. In some aspects, the UE may perform measurements (e.g., to obtain a reference signal received power (RSRP), a received signal strength indicator (RSSI), or some other signal strength metric) associated with the signaling. Additionally, or alternatively, the signaling may convey one or more parameters associated with the first sidelink transmission.

The UE may determine whether to transmit a second sidelink transmission (e.g., a mini-slot transmission) having a duration that is less than a duration of the first sidelink transmission based on the signal strength of the signaling, the one or more parameters, or both. In some aspects, the second sidelink transmission may correspond to sidelink resources in the slot that may be offset in time from a starting symbol of the first sidelink transmission. The UE may either transmit the second sidelink transmission in the sidelink resources within the slot or refrain from transmitting the second sidelink transmission during the slot based on an outcome of the transmission detection procedure. The transmission detection procedure described herein may thereby improve coordination between devices, throughput, and communication reliability.

A method for wireless communication implemented by a first UE is described. The method may include monitoring, during a slot, for SCI associated with a first sidelink transmission corresponding to first resources that span a duration of the slot, receiving the SCI based on the monitoring, the SCI indicating one or more parameters associated with the first sidelink transmission, and determining, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission.

An apparatus for wireless communication implemented by a first UE is described. The apparatus may include a processor and memory coupled with the processor. The memory may include instructions executable by the processor to cause the apparatus to monitor, during a slot, for SCI associated with a first sidelink transmission corresponding to first resources that span a duration of the slot, receive the SCI based on the monitoring, the SCI indicating one or more parameters associated with the first sidelink transmission, and determine, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission.

Another apparatus for wireless communication implemented by a first UE is described. The apparatus may include means for monitoring, during a slot, for SCI associated with a first sidelink transmission corresponding to first resources that span a duration of the slot, means for receiving the SCI based on the monitoring, the SCI indicating one or more parameters associated with the first sidelink transmission, and means for determining, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission.

A non-transitory computer-readable medium storing code for wireless communication implemented by a first UE is described. The code may include instructions executable by a processor to monitor, during a slot, for SCI associated with a first sidelink transmission corresponding to first resources that span a duration of the slot, receive the SCI based on the monitoring, the SCI indicating one or more parameters associated with the first sidelink transmission, and determine, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission.

Some aspects of the method, apparatuses, and non-transitory computer-readable medium described herein may further include operations, features, means, or instructions for measuring an RSRP associated with the SCI and comparing the measured RSRP with an RSRP threshold, where determining whether to transmit the second sidelink transmission may be based on the comparing.

Some aspects of the method, apparatuses, and non-transitory computer-readable medium described herein may further include operations, features, means, or instructions for transmitting the second sidelink transmission based on the measured RSRP being less than the RSRP threshold.

In some aspects of the method, apparatuses, and non-transitory computer-readable medium described herein, the one or more parameters indicated via the SCI include a first frequency allocation of the first resources associated with the first sidelink transmission and a value of the RSRP threshold may be based on the first frequency allocation of the first resources and a second frequency allocation of the second resources associated with the second sidelink transmission.

In some aspects of the method, apparatuses, and non-transitory computer-readable medium described herein, the one or more parameters indicated via the SCI include a first traffic priority associated with the first sidelink transmission and a value of the RSRP threshold may be based on the first traffic priority and a second traffic priority associated with the second sidelink transmission.

Some aspects of the method, apparatuses, and non-transitory computer-readable medium described herein may further include operations, features, means, or instructions for receiving a control message that indicates a set of multiple RSRP thresholds each associated with a respective pair of first and second traffic priorities, where the respective traffic priority pairs include a first traffic priority associated with the first resources and a second traffic priority associated with the second resources and selecting the RSRP threshold from the set of multiple RSRP thresholds based on the RSRP threshold corresponding to a pair of the first traffic priority associated with the first sidelink transmission and the second traffic priority associated with the second sidelink transmission.

In some aspects of the method, apparatuses, and non-transitory computer-readable medium described herein, the one or more parameters indicated via the SCI include a first traffic priority associated with the first sidelink transmission and the method, apparatuses, and non-transitory computer-readable medium may include further operations, features, means, or instructions for transmitting the second sidelink transmission based on a second traffic priority associated with the second sidelink transmission being greater than the first traffic priority associated with the first sidelink transmission.

In some aspects of the method, apparatuses, and non-transitory computer-readable medium described herein, the one or more parameters indicated via the SCI include a first zone identifier (ID) associated with the first sidelink transmission and the method, apparatuses, and non-transitory computer-readable medium may include further operations, features, means, or instructions for comparing the first zone ID associated with the first sidelink transmission with a second zone ID of the first UE, the first zone ID associated with a second UE that transmits the first sidelink transmission, a third UE that receives the first sidelink transmission, or both, where the determining whether to transmit the second sidelink transmission may be based on the comparing.

Some aspects of the method, apparatuses, and non-transitory computer-readable medium described herein may further include operations, features, means, or instructions for transmitting the second sidelink transmission based on the first zone ID being different than the second zone ID.

Some aspects of the method, apparatuses, and non-transitory computer-readable medium described herein may further include operations, features, means, or instructions for performing a listen-before-talk (LBT) procedure, where the monitoring for the SCI may be based on a success of the LBT procedure.

In some aspects of the method, apparatuses, and non-transitory computer-readable medium described herein, the monitoring for the SCI may include operations, features, means, or instructions for monitoring for the SCI within a first set of resource blocks (RBs) that may be overlapping, partially overlapping, or non-overlapping in a frequency domain with a second set of RBs allocated for the second sidelink transmission.

In some aspects of the method, apparatuses, and non-transitory computer-readable medium described herein, the SCI includes first stage SCI, second stage SCI, or both.

A method for wireless communication implemented by a first UE is described. The method may include monitoring one or more symbols in a slot for a DMRS associated with a first sidelink transmission corresponding to first resources that span a duration of the slot, measuring a signal strength of the DMRS based on the monitoring, and determining, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission.

An apparatus for wireless communication implemented by a first UE is described. The apparatus may include a processor and memory coupled with the processor. The memory may include instructions executable by the processor to cause the apparatus to monitor one or more symbols in a slot for a DMRS associated with a first sidelink transmission corresponding to first resources that span a duration of the slot, measure a signal strength of the DMRS based on the monitoring, and determine, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission.

Another apparatus for wireless communication implemented by a first UE is described. The apparatus may include means for monitoring one or more symbols in a slot for a DMRS associated with a first sidelink transmission corresponding to first resources that span a duration of the slot, means for measuring a signal strength of the DMRS based on the monitoring, and means for determining, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission.

A non-transitory computer-readable medium storing code for wireless communication implemented by a first UE is described. The code may include instructions executable by a processor to monitor one or more symbols in a slot for a DMRS associated with a first sidelink transmission corresponding to first resources that span a duration of the slot, measure a signal strength of the DMRS based on the monitoring, and determine, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission.

Some aspects of the method, apparatuses, and non-transitory computer-readable medium described herein may further include operations, features, means, or instructions for comparing the measured signal strength with a signal strength threshold, where determining whether to transmit the second sidelink transmission may be based on the comparing.

Some aspects of the method, apparatuses, and non-transitory computer-readable medium described herein may further include operations, features, means, or instructions for transmitting the second sidelink transmission based on the measured signal strength being less than the signal strength threshold.

Some aspects of the method, apparatuses, and non-transitory computer-readable medium described herein may further include operations, features, means, or instructions for selecting, from a set of multiple signal strength thresholds each associated with a respective traffic priority, the signal strength threshold based on a traffic priority of the second sidelink transmission.

In some aspects of the method, apparatuses, and non-transitory computer-readable medium described herein, the monitoring may include operations, features, means, or instructions for monitoring for the DMRS within a first set of RBs that may be overlapping, partially overlapping, or non-overlapping in a frequency domain with a second set of RBs allocated for the second sidelink transmission.

Some aspects of the method, apparatuses, and non-transitory computer-readable medium described herein may further include operations, features, means, or instructions for receiving the DMRS via the first set of RBs, where the DMRS indicates a third set of RBs allocated for the first sidelink transmission, the third set of RBs overlapping, partially overlapping, or non-overlapping in the frequency domain with the second set of RBs allocated for the second sidelink transmission.

In some aspects of the method, apparatuses, and non-transitory computer-readable medium described herein, the monitoring may include operations, features, means, or instructions for monitoring physical sidelink control channel (PSCCH) resources for the DMRS, where the DMRS includes a preamble for the first sidelink transmission.

In some aspects of the method, apparatuses, and non-transitory computer-readable medium described herein, the signal strength includes an RSRP.

A method for wireless communication implemented by a first UE is described. The method may include measuring a signal strength of sidelink signaling received across a set of multiple adjacent subbands in a frequency domain and within a first set of one or more symbols in a beginning portion of a slot, the sidelink signaling received via a sidelink communication link, comparing the signal strength of the sidelink signaling with a signal strength threshold, and determining, based on the comparing, whether to transmit a sidelink transmission via a first subband of the set of multiple adjacent subbands, the sidelink transmission corresponding to resources in the slot that are offset in time from the first set of one or more symbols in the slot.

An apparatus for wireless communication implemented by a first UE is described. The apparatus may include a processor and memory coupled with the processor. The memory may include instructions executable by the processor to cause the apparatus to measure a signal strength of sidelink signaling received across a set of multiple adjacent subbands in a frequency domain and within a first set of one or more symbols in a beginning portion of a slot, the sidelink signaling received via a sidelink communication link, compare the signal strength of the sidelink signaling with a signal strength threshold, and determine, based on the comparing, whether to transmit a sidelink transmission via a first subband of the set of multiple adjacent subbands, the sidelink transmission corresponding to resources in the slot that are offset in time from the first set of one or more symbols in the slot.

Another apparatus for wireless communication implemented by a first UE is described. The apparatus may include means for measuring a signal strength of sidelink signaling received across a set of multiple adjacent subbands in a frequency domain and within a first set of one or more symbols in a beginning portion of a slot, the sidelink signaling received via a sidelink communication link, means for comparing the signal strength of the sidelink signaling with a signal strength threshold, and means for determining, based on the comparing, whether to transmit a sidelink transmission via a first subband of the set of multiple adjacent subbands, the sidelink transmission corresponding to resources in the slot that are offset in time from the first set of one or more symbols in the slot.

A non-transitory computer-readable medium storing code for wireless communication implemented by a first UE is described. The code may include instructions executable by a processor to measure a signal strength of sidelink signaling received across a set of multiple adjacent subbands in a frequency domain and within a first set of one or more symbols in a beginning portion of a slot, the sidelink signaling received via a sidelink communication link, compare the signal strength of the sidelink signaling with a signal strength threshold, and determine, based on the comparing, whether to transmit a sidelink transmission via a first subband of the set of multiple adjacent subbands, the sidelink transmission corresponding to resources in the slot that are offset in time from the first set of one or more symbols in the slot.

Some aspects of the method, apparatuses, and non-transitory computer-readable medium described herein may further include operations, features, means, or instructions for transmitting the sidelink transmission based on the signal strength of the sidelink signaling being less than the signal strength threshold.

In some aspects of the method, apparatuses, and non-transitory computer-readable medium described herein, the comparing may include operations, features, means, or instructions for comparing a respective signal strength of the sidelink signaling received via each subband of the set of multiple adjacent subbands with a respective signal strength threshold of a set of multiple signal strength thresholds, where signal strength thresholds associated with each subband of the set of multiple adjacent subbands may be different.

In some aspects of the method, apparatuses, and non-transitory computer-readable medium described herein, a value of a first signal strength threshold associated with the first subband via which the sidelink transmission may be scheduled may be less than values of second signal strength thresholds of the set of multiple signal strength thresholds.

Some aspects of the method, apparatuses, and non-transitory computer-readable medium described herein may further include operations, features, means, or instructions for performing a first LBT procedure for channel access and performing a second LBT procedure based on a success of the first LBT procedure, where the measuring the signal strength of the sidelink signaling may be based on performing the second LBT procedure.

In some aspects of the method, apparatuses, and non-transitory computer-readable medium described herein, the signal strength corresponds to a RSSI and the signal strength threshold corresponds to an energy detection threshold.

DETAILED DESCRIPTION

Figure 1:
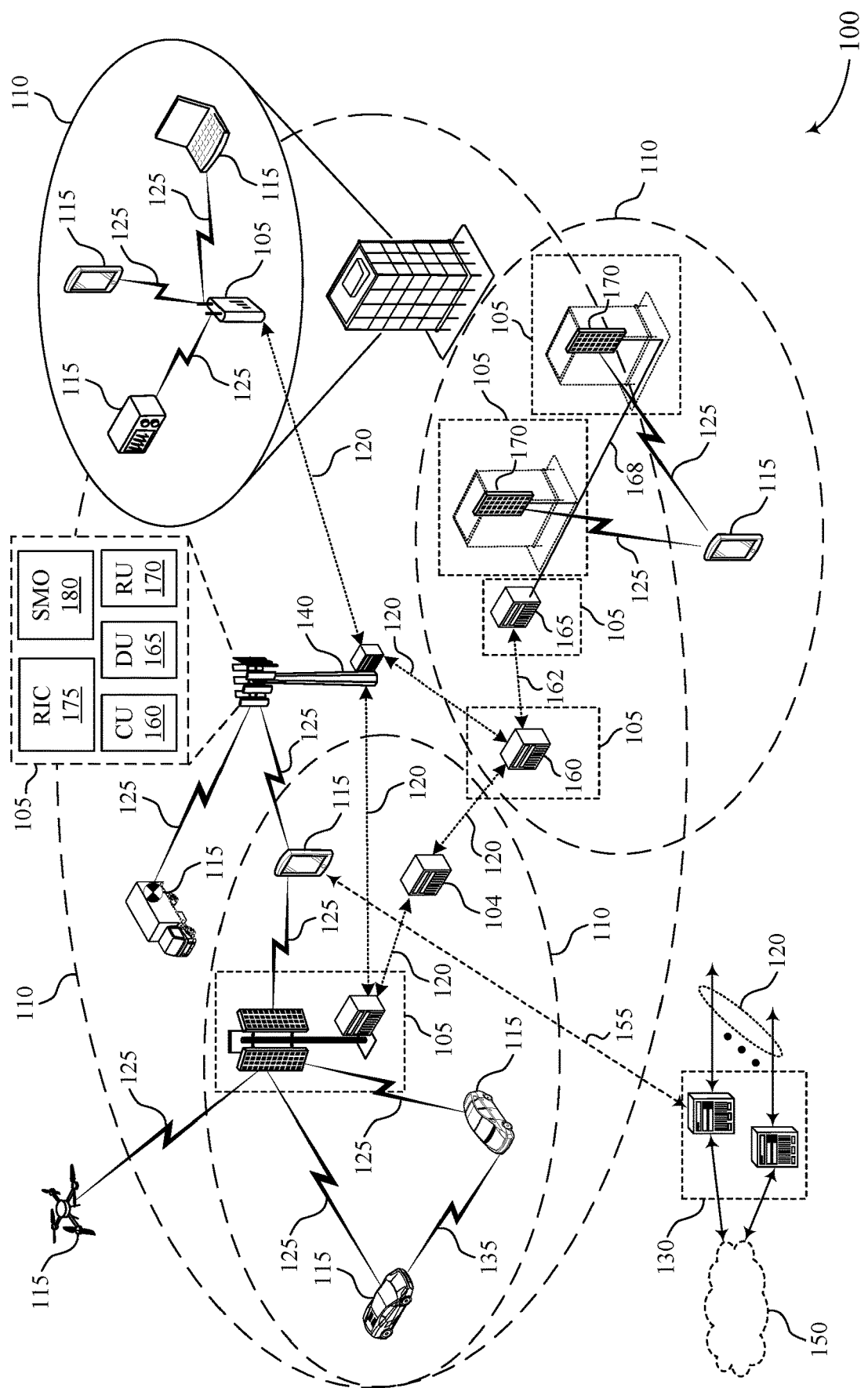
FIG. 1 illustrates an example of a wireless communications system that supports full-slot transmission detection for sidelink communications in accordance with one or more aspects of the present disclosure.

In some wireless communications systems, wireless devices, such as user equipments (UEs) may perform sidelink communications. In some aspects, a sidelink UE may be scheduled with sidelink resources for transmitting a sidelink message to one or more other sidelink UEs. Additionally, or alternatively, the UE may select the sidelink resources from a sidelink resource pool to use for transmitting the message. The sidelink resources via which the message is transmitted may span a duration of a slot, which may be referred to as slot transmissions, or may span a relatively shorter duration (e.g., a portion of a slot, such as one or more symbols), which may be referred to as mini-slot transmissions. The slot transmissions may begin at a beginning of a slot (e.g., after a first symbol in the slot). The mini-slot transmissions may begin at the beginning of a slot or in a symbol that is later in the slot (e.g., the middle of the slot). Separate resource pools may be configured for slot-based and mini-slot-based transmissions, in some aspects. To receive a slot-based sidelink message from a first transmitting UE in a first slot, a receiving UE may measure a first symbol in the slot, which may be referred to as an automatic gain control (AGC) symbol, and the receiving UE may adjust a gain control according to the measurements. If a second transmitting UE starts transmitting a mini-slot transmission in the middle of the slot (e.g., after a successful channel access procedure, such a listen-before-talk (LBT) procedure), the mini-slot transmission may interfere with the slot transmission, and the gain control setting of the receiving UE may no longer be appropriate, which may reduce throughput and reliability of communications.

Techniques, systems, and devices described herein provide for a UE that is scheduled to transmit a mini-slot transmission to monitor for sidelink signaling and to determine whether to transmit the mini-slot transmission based on parameters associated with the sidelink signaling. The sidelink signaling may include sidelink control information (SCI), a demodulation reference signal (DMRS), or other signaling in one or more subbands that are the same as or different than a first subband via which the UE is scheduled to transmit the mini-slot transmission. In some aspects, the UE may monitor for SCI associated with a slot transmission that occurs in time resources, frequency resources, or both that at least partially overlap with time and frequency resources via which the UE is to transmit the mini-slot transmission. The SCI may indicate parameters such as a resource allocation, a traffic priority, a zone (e.g., a geographical region), or any combination thereof, associated with the slot transmission. The UE may determine whether to transmit the mini-slot transmission based on a comparison of values of the one or more parameters with one or more thresholds configured for transmission detection (e.g., slot transmission detection, full-slot transmission detection). The UE may refrain from transmitting the mini-slot transmission if it is likely to interfere with a slot transmission in relatively nearby resources (e.g., in the frequency domain), a slot transmission having a higher traffic priority, or both, which may reduce latency and improve throughput of communications.

In some other aspects, the UE may monitor physical sidelink control channel (PSCCH) resources for a preamble of a slot transmission (e.g., a DMRS) in time and frequency resources that at least partially overlap with resources via which the UE is to transmit the mini-slot transmission. The UE may determine whether to transmit the mini-slot transmission based on a comparison of a signal strength of the preamble with a signal strength threshold configured for transmission detection. Additionally, or alternatively, the UE may monitor for signaling in multiple subbands that are adjacent to or overlapping with a subband in which the UE is to transmit the mini-slot transmission. The UE may determine whether to transmit the mini-slot transmission based on a comparison of a signal strength of the signaling with one or more signal strength thresholds. Such thresholds may be configured per subband or may be modified (e.g., relaxed) based on the subband in which the signaling is detected. The UE may thereby utilize one or more techniques described herein to determine whether to transmit a mini-slot transmission or to backoff and refrain from transmitting the mini-slot transmission due to another slot transmission, which may improve coordination between devices, throughput, and reliability of the sidelink communications.

Aspects of the disclosure are initially described in the context of wireless communications systems. Additional aspects of the disclosure are described with reference to a sidelink resource configuration, a zone configuration, and process flows. Aspects of the disclosure are further illustrated by and described with reference to apparatus diagrams, system diagrams, and flowcharts that relate to full-slot transmission detection for sidelink communications.

FIG. 1 illustrates an example of a wireless communications system 100 that supports full-slot transmission detection for sidelink communications in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). In one aspect, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. In some aspects, a node may be a UE 115. In some aspects, a node may be a network entity 105. In other aspects, a first node may be configured to communicate with a second node or a third node. In one aspect, the first node may be a UE 115, the second node may be a network entity 105, and the third node may be a UE 115. In another aspect, the first node may be a UE 115, the second node may be a network entity 105, and the third node may be a network entity 105. In yet other aspects, the first, second, and third nodes may be different. Similarly, reference to a UE 115, network entity 105, apparatus, device, computing system, or the like may include disclosure of the UE 115, network entity 105, apparatus, device, computing system, or the like being a node. In some aspects, disclosure that a UE 115 is configured to receive information from a network entity 105 also discloses that a first node is configured to receive information from a second node.

In some aspects, network entities 105 may communicate with the core network 130, or with one another, or both. In one aspect, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). In some aspects, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. In some aspects, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

In some aspects, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. In some aspects, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support full-slot transmission detection for sidelink communications as described herein. In some aspects, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. In some aspects, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. In some aspects, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. In one aspect, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$, may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. In some aspects, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. In some aspects, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Aspects of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. In some aspects, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. In some aspects, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. In some aspects, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. In some aspects, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. In some aspects, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. In one aspect, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. In some aspects, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. In some aspects, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

In some aspects, a UE 115 within the wireless communications system 100 may perform a transmission detection procedure (e.g., full-slot transmission detection) to determine whether to transmit a mini-slot transmission. To perform the transmission detection procedure, the UE 115 may monitor sidelink resources within a slot in a time domain and one or more subbands in a frequency domain for signaling associated with a first sidelink transmission that corresponds to resources that span a duration of the slot (e.g., a slot-based transmission). The signaling may include SCI, a DMRS, or other sidelink signaling associated with the first sidelink transmission. In some aspects, the UE 115 may measure a signal strength (e.g., a reference signal received power (RSRP), a received signal strength indicator (RSSI), or some other signal strength metric) associated with the signaling. Additionally, or alternatively, the signaling may convey one or more parameters associated with the first sidelink transmission.

The UE 115 may determine whether to transmit a second sidelink transmission having a duration that is less than a first duration of the first sidelink transmission (e.g., a mini-slot transmission) based on the signal strength of the signaling, the one or more parameters, or both. In some aspects, the second sidelink transmission may correspond to sidelink resources in the slot that may be offset in time from a starting symbol of the first sidelink transmission. The UE 115 may either transmit the mini-slot transmission via the sidelink resources within the slot or refrain from transmitting the second sidelink transmission during the slot based on an outcome of the transmission detection procedure. The transmission detection procedure described herein may thereby improve coordination between devices, throughput, and communication reliability.

Figure 2:
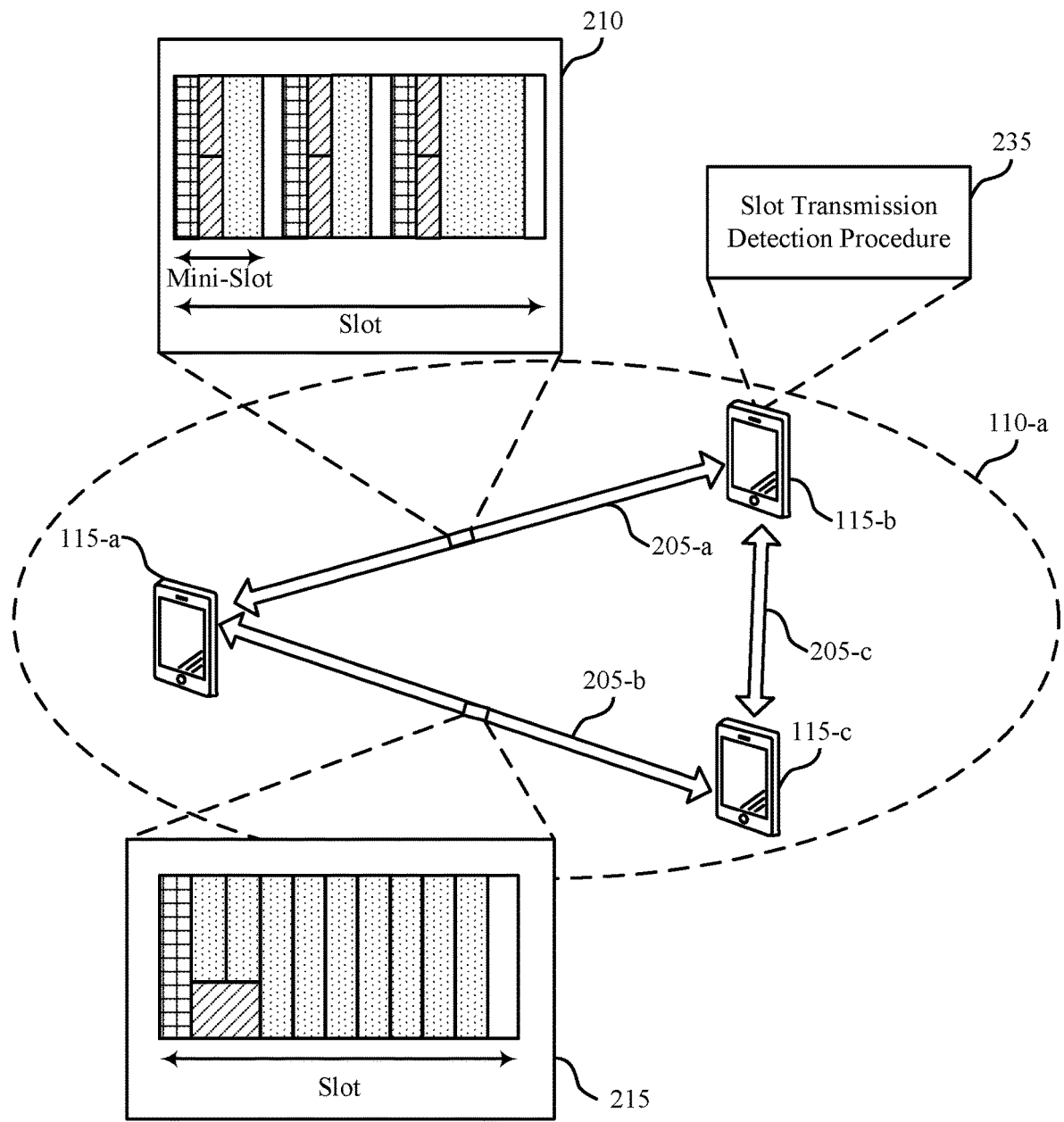
FIG. 2 illustrates an example of a wireless communications system that supports full-slot transmission detection for sidelink communications in accordance with one or more aspects of the present disclosure.

FIG. 2 illustrates an example of a wireless communications system 200 that supports full-slot transmission detection for sidelink communications in accordance with one or more aspects of the present disclosure. The wireless communications system 200 may implement or be implemented by aspects of the wireless communications system 100 as described with reference to FIG. 1. The wireless communications system 200 may include UEs 115-a, 115-b, and 115-c, which may represent examples of a UE 115 as described with reference to FIG. 1. The UEs 115 may communicate within a geographic coverage area 110-a and via one or more respective communication links 205 (e.g., communication links 205-a, 205-b, and 205-c). The UEs 115 described herein may support mini-slot transmissions 210, slot transmissions 215, or both.

In some aspects, a network entity 105 (not pictured in FIG. 2) may schedule sidelink communications between the UEs 115 within the geographic coverage area 110-a (e.g., for Mode 1 sidelink communications). The network entity 105 may transmit a control message that allocates sidelink resources for one or more sidelink transmissions. Additionally, or alternatively, a transmitting UE 115 may perform a channel sensing or channel access procedure (e.g., LBT) to detect transmissions by other devices (e.g., other UEs), and the transmitting UE 115 may select available sidelink resources for a sidelink transmission from a pool of configured sidelink resources (e.g., for Mode 2 sidelink communications).

The sidelink messages transmitted by the UEs 115 may be transmitted via resources that span a duration of a slot in a time domain, which may be referred to herein as slot-based transmissions or slot transmissions 215. Additionally, or alternatively, the sidelink messages may be transmitted via resources that span a shorter duration (e.g., a portion of a slot), which may be referred to herein as mini-slot-based transmissions or mini-slot transmissions 210. The sidelink resources for a given sidelink transmission may be allocated or selected from a sidelink resource pool, which may represent a pool or set of time and frequency resources allocated for sidelink communications.

Separate resource pools may be configured for slot-based sidelink transmissions and mini-slot-based sidelink transmissions, in some aspects. The slot-based resource pool may be partially overlapping, fully overlapping, or non-overlapping with the mini-slot-based resource pool in a time and frequency domain. In some aspects, some devices may be capable of supporting slot transmissions 215 but may not support mini-slot transmissions 210. In one aspect, the devices may not be capable of sensing SCI associated with the mini-slot transmissions 210. By configuring a separate mini-slot resource pool that is non-overlapping with the slot-based resource pool, interference between such devices may be reduced or mitigated. The separate mini-slot-based and slot-based resource pools may be multiplexed in the time domain (e.g., TDM), the frequency domain (e.g., FDM), or both, such that the resources in the separate resource pools are different, as described and illustrated in further detail elsewhere herein, including with reference to FIG. 3.

An example format for a mini-slot transmission 210 is illustrated in FIG. 2. The mini-slot transmission 210 illustrated in FIG. 2 includes three mini-slots within a slot. The mini-slots may each include one or more symbols in the time domain and a set of frequency resources (e.g., resource blocks) in the frequency domain. In some aspects, the resources illustrated in the mini-slot transmission 210 may span a subband or subchannel in the frequency domain. As illustrated in FIG. 2, a first symbol in the slot may include AGC resources 220 and may be referred to as an AGC symbol. A receiving UE 115 may perform measurements in the AGC symbol to set a gain control for receiving the mini-slot transmissions 210. One or more symbols or portions of symbols after the AGC symbol in the time domain may include PSCCH resources 225. A portion of the PSCCH resources 225 may be allocated or reserved for first stage SCI (SCI-1) and a portion of the PSSCH resources 230 may be allocated or reserved for second stage SCI (SCI-2), a DMRS, or both. The PSCCH resource 225, the PSSCH resource 230, or both may further include a preamble of the mini-slot transmissions 210. In some aspects, SCI-2 may be mapped to contiguous RBs in PSSCH starting from a first symbol that includes the PSSCH DMRS, and SCI-1 may provide an indication of a location of SCI-2. The first and second stage SCI, as well as the preamble, may indicate one or more parameters associated with a set of PSSCH resources 230 included in one or more symbols following the PSCCH resources 225 in the time domain. The sidelink message may be transmitted via the PSSCH resources 230. The sidelink message in each mini-slot may be followed by one or more gap symbols, which may include null resources.

Each mini-slot transmission 210 may be transmitted using a similar format of AGC resources 220, PSCCH resources 225, PSSCH resources 230, and null or gap resources. A duration of each mini-slot transmission 210 may be the same or different. Some mini-slot transmissions 210 may span two symbols, three symbols, four symbols, or some other quantity of symbols. The duration of the mini-slot transmissions 210 may be less than a duration of a slot. The mini-slot transmissions 210 may begin in any symbol in the slot and may extend across one or more slot boundaries, in some aspects.

An example format for a slot transmission 215 is illustrated in FIG. 2. The first symbol in the slot may be an AGC symbol including the AGC resources 220 for a receiving UE 115 to use for performing gain control. One or more symbols subsequent to the AGC symbol in the slot may include at least some PSCCH resources 225. In one aspect, a subset of frequency resources in the two symbols following the AGC symbol in the slot may include PSCCH resources 225. The PSCCH resources 225 may be allocated or reserved for SCI-1, DMRS for the PSCCH, a preamble for the transmission, or any combination thereof. The symbols following the AGC symbol may additionally, or alternatively, include PSSCH resources 230 allocated for transmission and reception of sidelink messages, and may further include SCI-2, DMRS for the PSSCH, or both. In some aspects, one or more symbols in the slot transmission 215 may include DMRS resources that may be reserved for DMRS sequences associated with the sidelink message.

In some aspects, the slot-based resource pool and the mini-slot-based resource pool may be in a same frequency band and may or may not overlap in the frequency domain. In such cases, transmissions via both resource pools may result in interference and reduced throughput. In one aspect, the UE 115-a may perform an AGC procedure based on measurements of the AGC resources 220 in the first symbol of the slot. The UE 115-a may set an AGC of the UE 115-a for receiving the remainder of the slot transmission 215 after the first symbol in the slot. If the UE 115-b has a sidelink message to transmit via the mini-slot resource pool, the UE 115-b may perform an LBT procedure in a subband that is the same or different than the subband via which the slot transmission 215 is conveyed. If the subband is the same, the LBT procedure may fail due to the slot transmission 215 (e.g., if an energy detection of the slot-transmission is above a threshold level), and the UE 115-b may refrain from transmitting the mini-slot transmission 210, which may reduce throughput.

If the mini-slot resource pool is in a first subband and the slot resource pool is in a different subband, the LBT procedure at the UE 115-b may succeed in the first subband and the UE 115-b may start transmitting a mini-slot transmission 210 to a different UE 115 (not pictured in FIG. 2) during a symbol in the slot that is after the AGC symbol. In such cases, the mini-slot transmission 210 may impact reception of the slot transmission 215 by an intended receiving UE 115-a. In one aspect, if the UE 115-b is relatively close to the UE 115-a, the UE 115-a may receive the mini-slot transmission 210 from the UE 115-b in the middle of the slot. The AGC setting of the UE 115-a may not be set to an appropriate level, such that clipping may occur if a combined signal power of the mini-slot transmission 210 and the slot transmission 215 exceeds a threshold interference margin.

Techniques, systems, and devices described herein provide for a transmitting UE 115 that is to transmit a mini-slot transmission, such as the UE 115-b illustrated in FIG. 2, to perform a slot transmission detection procedure 235 to determine whether to transmit the mini-slot transmission 210 or to backoff due to a slot transmission 215 in a same or different subband. The UE 115-b may perform the slot transmission detection procedure 235 in addition to or as an alternative to a channel sensing procedure (e.g., LBT). In some aspects described herein, to perform the slot transmission detection procedure 235, the UE 115-b may monitor PSCCH resources 225 in one or more subbands (e.g., sets of resource blocks) that overlap or do not overlap with a subband via which the UE 115 is to transmit a mini-slot transmission. The UE 115-b may monitor for SCI (e.g., SCI-1, SCI-2, or both), a DMRS, or both associated with slot transmissions 215. The UE 115-b may determine whether to transmit the mini-slot transmission based on the parameters indicated via the SCI, a signal strength of the SCI, a signal strength of the DMRS, one or more thresholds for slot transmission detection, or any combination thereof. Techniques for monitoring PSCCH resources 225 to determine whether to backoff a mini-slot transmission 210 are described in further detail elsewhere herein, including with reference to FIGS. 3 and 4.

In some other aspects described herein, performing the slot transmission detection procedure 235 may include performing multiple channel access procedures in multiple subbands to determine whether to transmit a mini-slot transmission 210 or to backoff the mini-slot transmission 210. The UE 115-b may determine whether to transmit the mini-slot transmission 210 based on a comparison of a signal strength (e.g., an energy detection or RSSI) of signaling received in the one or more subbands with one or more signal strength thresholds. The signal strength thresholds may be configured per subband or may be modified based on a subband in which the signaling is detected. Such channel access procedures are described in further detail elsewhere herein, including with reference to FIG. 3.

A sidelink UE 115 as described herein may thereby perform a slot transmission detection procedure 235 to identify or detect ongoing slot transmissions in one or more adjacent subbands before transmitting a mini-slot transmission 210. The described techniques may provide for the UE 115 to refrain from transmitting the mini-slot transmission 210 (e.g., backoff) if the UE 115 detects a slot transmission 215 that is nearby, that has a higher priority than the mini-slot transmission 210, that has a stronger signal strength than the mini-slot transmission 210, or any combination thereof, which may improve coordination between devices, increase throughput, and reduce latency of sidelink communications.

Figure 3:
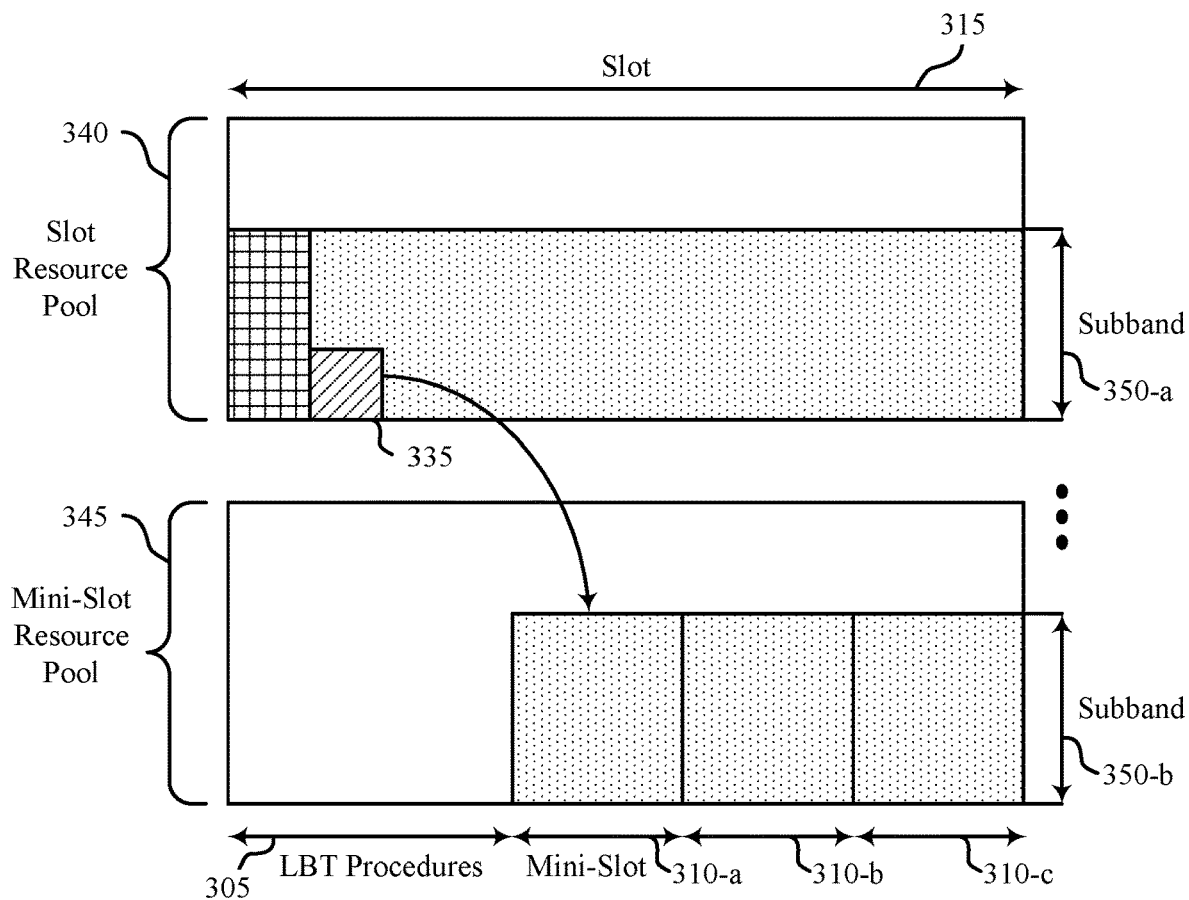
FIG. 3 illustrates an example of a sidelink resource configuration that supports full-slot transmission detection for sidelink communications in accordance with one or more aspects of the present disclosure.
Figure 3:
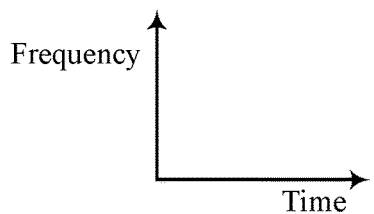
Figure 3:
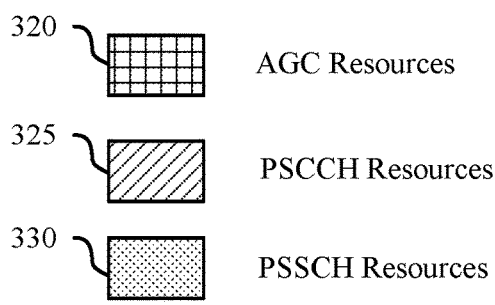

FIG. 3 illustrates an example of a sidelink resource configuration 300 that supports full-slot transmission detection for sidelink communications in accordance with one or more aspects of the present disclosure. The sidelink resource configuration 300 may implement or be implemented by aspects of the wireless communications systems 100 or 200, as described with reference to FIGS. 1 and 2. The sidelink resource configuration 300 illustrates an example of a slot resource pool 340 and a mini-slot resource pool 345 that are configured for slot transmissions and mini-slot transmissions, respectively, as described with reference to FIG. 2. The sidelink slot and mini-slot transmissions may be transmitted and received by sidelink UEs 115 or other sidelink devices, which may represent aspects of corresponding devices as described with reference to FIGS. 1 and 2. In this aspect, a transmitting UE 115 may monitor PSCCH resources 325 in one or more subbands 350 (e.g., subband 350-a, subband 350-b) for SCI 335 or a DMRS that indicates parameters associated with a slot transmission.

The slot resource pool 340 may include a first set of time and frequency resources and the mini-slot resource pool 345 may include a second set of time and frequency resources for sidelink communications. In FIG. 3, the first set of resources in the slot resource pool 340 may be partially overlapping with the second set of resources in the mini-slot resource pool 345 in the time domain, and may be non-overlapping with the second set of resources in the mini-slot resource pool 345 in the frequency domain (e.g., the resources may be FDMed). The first set of resources may be within the subband 350-a and the second set of resources may be within the subband 350-b. The subband 350-a may be adjacent to or offset from the subband 350-b in the frequency domain. However, although not pictured in FIG. 3, it is to be understood that the first and second sets of resources in the respective resource pools may be partially overlapping, fully overlapping, or non-overlapping in one or both of the time domain and the frequency domain, in some aspects.

A transmitting UE 115 may perform a channel access procedure (e.g., an LBT procedure) in the subband 350-b via which the UE 115 is to transmit a mini-slot transmission. The UE 115 may perform the channel access procedure prior to a beginning or starting boundary of a slot 315 via which the UE 115 may transmit the mini-slot transmission. As part of the channel access procedure, the UE 115 may compare an energy detection level of signaling in the subband 350-b to an energy detection threshold. If the detected energy detection level is less than the energy detection threshold, the channel access procedure may be successful, and the UE 115 may select resources from the mini-slot resource pool 345 during the slot 315 for transmitting the mini-slot transmission.

In some aspects, however, the slot resource pool 340 may be configured within a same frequency band as the mini-slot resource pool 345 (e.g., the subbands 350-a and 350-b may be in a same frequency band), and a transmission via the mini-slot resource pool 345 may interfere with a transmission via the slot resource pool 340. As described with reference to FIG. 2, a first receiving UE 115 that receives a slot transmission in the slot 315 may set an AGC setting based on measurements of the AGC resources 320 in the AGC symbol at the beginning of the slot 315. If the mini-slot transmission in the mini-slot resource pool 345 starts after the AGC symbol (e.g., a transmission starting in or after the mini-slot 310-a), the AGC setting of the first receiving UE 115 may not support the interference caused by the mini-slot transmission, and some or all of the sidelink communications may be corrupted.

Techniques, systems, and devices described herein provide for a transmitting UE 115 to perform a slot transmission detection procedure (e.g., the slot transmission detection procedure 235 described with reference to FIG. 2) to determine whether to transmit a mini-slot transmission or to backoff the mini-slot transmission in favor of a slot transmission. In some aspects described herein, to perform the slot transmission detection procedure, the UE 115 may monitor for SCI 335 associated with a sidelink transmission (e.g., a slot-based transmission). In the example of FIG. 3, the UE 115 is scheduled to transmit a sidelink message via the mini-slots 310-a, 310-b, and 310-c in the subband 350-b. The UE 115 may monitor for the SCI 335 in the subband 350-b, in the subband 350-a, in one or more other subbands 350, within some other set of RBs, or any combination thereof. In some aspects, the UE 115 may monitor for the SCI 335 in each subband 350 in a given frequency band. The SCI 335 may indicate a set of PSSCH resources 330 allocated for a slot transmission. The set of PSSCH resources 330 may be overlapping or non-overlapping with a second set of PSSCH resources 330 allocated for the mini-slot transmissions by the transmitting UE 115.

The SCI (e.g., a first stage SCI, a second stage SCI, or both) may convey one or more parameters associated with a corresponding slot transmission, such as time domain resource allocation, a frequency domain resource allocation (e.g., an FDRA field indicating one or more RB sets for the slot transmission), a traffic priority, a signal strength level (e.g., DMRS RSRP), a zone associated with the transmission, other sidelink parameters, or any combination thereof. The transmitting UE 115 may determine whether to transmit the mini-slot transmission based on the parameters indicated via the SCI 335 and one or more thresholds for slot transmission detection. In one aspect, the UE 115 may determine whether to transmit the mini-slot transmission based on one or more zone identifiers (IDs) indicated via the SCI 335 and a zone ID associated with the UE 115, as described in further detail elsewhere herein, including with reference to FIG. 4.

Additionally, or alternatively, the UE 115 may determine whether to transmit the mini-slot transmission based on a traffic priority indicated via the SCI 335. The SCI 335 may indicate a first traffic priority of the slot transmission, and the UE 115 may compare the first traffic priority of the slot transmission with a second traffic priority of the mini-slot transmission to be transmitted by the UE 115. The UE 115 may determine whether to transmit the mini-slot transmission based on the relative traffic priorities. In some aspects, if the slot transmission is associated with a first traffic priority that is greater than or the same as the second traffic priority of the mini-slot transmission, the UE 115 may determine to backoff and refrain from transmitting the mini-slot transmission in the slot 315. If the first traffic priority of the slot transmission is less than the second traffic priority of the mini-slot transmission, the UE 115 may transmit the mini-slot transmission in one or more of the mini-slots 310-a, 310-b, and 310-c.

In some other aspects, the UE 115 may measure a signal strength level of the SCI (e.g., an RSRP). The UE 115 may compare the measured signal strength level with a signal strength threshold. The signal strength threshold may be indicated to the UE 115 via control signaling or configured at the UE 115 (e.g., a defined threshold level). If the measured signal strength of the SCI 335 associated with the slot transmission is greater than or the same as the signal strength threshold, the UE 115 may backoff and refrain from transmitting the mini-slot transmission in the slot 315. If the measured signal strength is less than the signal strength threshold, the UE 115 may transmit the mini-slot transmission in the slot 315.

In some aspects, different signal strength thresholds may be configured for different subbands 350, or a value of the signal strength threshold may be modified (e.g., increased or decreased) based on a subband or set of RBs in which the SCI 335 is detected. In one aspect, if the SCI is associated with a slot transmission via PSSCH resources 330 that are non-overlapping in the frequency domain with the PSSCH resources 330 allocated for the mini-slot transmission, the signal strength threshold may be higher than if the SCI is associated with a slot transmission via PSSCH resources 330 that partially or fully overlap in the frequency domain with the PSSCH resources 330 allocated for the mini-slot transmission. A value of the signal strength threshold may be modified based on a relative distance, in the frequency domain (e.g., a quantity of subchannels, subbands 350, RBs, or any combination thereof), between the PSSCH resources 330 for the slot transmission and the PSSCH resources 330 for the mini-slot transmission.

In some aspects, the UE 115 may determine whether to transmit the mini-slot transmission based on a combination of the traffic priority indicated via the SCI 335 and a signal strength level of the SCI 335 associated with the slot transmission (e.g., a preamble of the slot transmission). In one aspect, different signal strength thresholds or values of a signal strength threshold may be configured for different traffic priorities. In some aspects, a network entity may transmit a control message to the UE 115 that indicates (e.g., configures) multiple signal strength thresholds that are each associated with a respective pair of first and second traffic priorities. The first traffic priority in each pair may correspond to a traffic priority of a slot transmission and the second traffic priority in each pair may correspond to a traffic priority of a mini-slot transmission, or vice versa. The UE 115 may select a signal strength threshold from among the signal strength thresholds indicated via the control message based on the signal strength threshold corresponding to the first traffic priority indicated via the SCI 335 and the second traffic priority associated with the mini-slot transmission. If the UE 115 measures a signal strength level of the SCI 335 that is greater than or the same as the selected signal strength threshold, the UE 115 may backoff and refrain from transmitting the mini-slot transmission in the slot 315. If the UE 115 measures a signal strength level of the SCI 335 that is less than the selected signal strength threshold, the UE 115 may transmit the mini-slot transmission in the slot 315.

In some other aspects described herein, to perform the slot transmission detection procedure, the UE 115 may monitor the PSCCH resources 325 for a DMRS sequence or a preamble associated with a sidelink transmission (e.g., a slot-based transmission). The DMRS may be transmitted in the PSCCH resources 225 at the beginning of the slot 315 (e.g., after the AGC symbol), or in one or more symbols that include DMRS resources in the middle of the slot 315, or both. The DMRS pattern may be known to the UE 115, and the DMRS may represent an example of a preamble for the slot transmission. In the example of FIG. 3, the UE 115 may monitor for the DMRS in the subband 350-*b*, in the subband 350-*a*, in one or more other subbands 350, within some other set of RBs, or any combination thereof. In some aspects, the UE 115 may monitor for the DMRS in each subband 350 in a given frequency band.

In some aspects, the UE 115 may not be capable of decoding the SCI 335 associated with a slot transmission before the UE 115 is scheduled to begin a mini-slot transmission. In such aspects, the UE 115 may monitor for or detect a preamble of the slot transmission (e.g., instead of or in addition to monitoring for the SCI 335) to reduce latency and complexity. The preamble may correspond to a DMRS, in some aspects. The UE 115 may measure a signal strength level of the DMRS, such as a DMRS RSRP. The UE 115 may compare the measured signal strength level with a threshold signal strength. If the RSRP of the DMRS is greater than or the same as the threshold signal strength level, the UE 115 may backoff and refrain from transmitting the mini-slot transmission during the slot 315. If the RSRP of the DMRS is less than the signal strength threshold, the UE 115 may determine to transmit the mini-slot transmission during the slot 315. The signal strength threshold may be the same as or different than the signal strength threshold configured for the SCI 335. The signal strength threshold may be indicated to the UE 115 via a control message. In some aspects, multiple signal strength thresholds may be configured, and the UE 115 may select from among the multiple signal strength thresholds based on a traffic priority of the mini-slot transmission. In one aspect, a relatively high traffic priority may be associated with a relatively high RSRP threshold (e.g., or an infinite RSRP threshold), which may ensure that high-priority traffic avoids interference from other transmissions.

In some aspects, the PSCCH resources 325 in a first RB set or a first subband 350 may schedule or indicate PSSCH resources 330 (e.g., a wideband PSSCH transmission) in a second RB set or a second subband 350. In one aspect, the UE 115 may detect SCI 335 or a DMRS sequence in a first subband 350 (not illustrated in FIG. 3) that points to the PSSCH resources 330 allocated for the slot transmission in the subband 350-*a* illustrated in FIG. 3. Additionally, or alternatively, the SCI 335 or the DMRS in the subband 350-*a* may indicate PSSCH resources allocated for a slot transmission in the same subband 350-*b* via which the UE 115 is scheduled to transmit the mini-slot transmission. Accordingly, by monitoring multiple sets of RBs and subbands 350 for the PSCCH resources 325, the UE 115 may detect ongoing sidelink transmissions.

The UE 115 may monitor for and measure the SCI 335, the DMRS, or both received via the PSCCH resource 325 in addition to performing a channel access procedure prior to a starting boundary of the slot 315. In one aspect, the UE 115 may perform a channel access procedure (e.g., LBT) in the subband 350-*b* prior to transmitting the mini-slot transmission. If the channel access procedure is successful, the UE 115 may additionally monitor for and measure the PSCCH resources 325 as described herein to determine whether to transmit the mini-slot transmission. If the channel access procedure is unsuccessful, the UE 115 may, in some aspects, refrain from monitoring for and measuring the PSCCH resources 325. Instead, the UE 115 may determine to backoff and refrain from transmitting the mini-slot transmission during the slot 315 based on the failure of the channel access procedure. Additionally, or alternatively, the UE 115 may monitor for and measure the PSCCH resources 325 in the slot 315 regardless of a result of a channel access procedure.

In some other aspects described herein, the UE 115 may perform multiple LBT procedures 305 in multiple subbands 350 as part of the slot transmission detection procedure. Performing the LBT procedures 305 may include monitoring for sidelink signaling and comparing a measured a signal strength, such as a received signal strength indicator (RSSI), of the sidelink signaling with one or more signal strength thresholds, such as energy detection thresholds. Such thresholds may be modified based on a subband 350 in which the signaling is detected. The UE 115 may thereby consider RSSI measurements in one or more subbands 350 when determining whether to transmit a mini-slot transmission in the subband 350-b. If the detected signal strength in one or more of the subbands 350 is greater than or the same as the signal strength threshold, the UE 115 may backoff and refrain from transmitting the mini-slot transmission during the slot 315. If the detected signal strength in at least some or in all of the subbands 350 is less than the signal strength threshold, the UE 115 may determine to transmit the mini-slot transmission in the slot 315.

The LBT procedures 305 performed as part of the transmission detection procedure for determining whether to transmit the mini-slot transmission may, in some aspects, be different than an initial LBT procedure 305 for channel access within the slot 315. In one aspect, the UE 115 may perform an initial LBT procedure 305 for channel access (e.g., Type 1 or Type 2) in the subband 350-b via which the UE 115 is to transmit the mini-slot transmission. The UE 115 may perform the first LBT procedure 305 prior to a starting boundary of the slot 315, in some aspects (not illustrated in FIG. 3). If the first LBT procedure 305 succeeds, the UE 115 may determine a set of sidelink resources within the slot 315 and in the subband 350-b that are available for a mini-slot transmission. To ensure that the mini-slot transmission does not interfere with other slot transmissions in the same or different subbands 350, the UE 115 may perform the one or more other LBT procedures 305 in the same subband 350-b, one or more other subbands 350 (e.g., the subband 350-a), or both during a beginning portion of the slot 315 before the scheduled mini-slots 310 (e.g., mini-slot 310-a, mini-slot 310-b, mini-slot 310-c). In some aspects, the UE 115 may reuse the RSSI sensing results obtained during the initial LBT procedure 305 for channel access if the initial LBT procedure is in the same subband 350-b as a subsequent LBT procedure 305 for slot transmission detection.

The UE 115 may utilize the same or different signal strength thresholds for the LBT procedures 305 in each subband 350. A first signal strength threshold for a first LBT procedure 305 in the subband 350-b via which the mini-slot transmission is scheduled (e.g., a target subband 350-b) may be relatively strict (e.g., low), and one or more second signal strength thresholds for second LBT procedures 305 in other subbands 350 that are adjacent or non-adjacent to the target subband 350-b, such as the subband 350-a, may be more relaxed (e.g., higher). In some aspects, a value of the signal strength threshold for a given subband 350 may be modified based on a proximity of the subband 350 to the target subband 350-b in the frequency domain.

The UE 115 may thereby monitor for signaling, such as SCI 335, a DMRS, or other sidelink signaling, in one or more subbands 350 and determine whether to transmit a mini-slot transmission in the subband 350-b or backoff to a slot transmission in one of the other subbands 350 based on the received signaling. If the UE 115 determines to backoff, the UE 115 may refrain from transmitting via the mini-slots 310-a, 310-b, and 310-c. Instead, the UE 115 may transmit the mini-slot transmission in resources in a subsequent slot 315. If the UE 115 determines to transmit the mini-slot transmission, the UE 115 may transmit one or more sidelink messages via the PSSCH resources 330 in one or more of the mini-slots 310-a, 310-b, and 310-c.

By performing the slot transmission detection procedure described herein, the UE 115 may refrain from interfering with slot transmissions in a same or different subband 350. Additionally, or alternatively, the UE 115 may determine to transmit regardless of a slot transmission in one or more adjacent subbands 350 based on one or more relative parameters associated with the mini-slot transmission and the slot transmission. The described techniques may thereby provide for improved coordination between devices, reduced latency, and improved throughput and reliability of sidelink communications.

Figure 4:
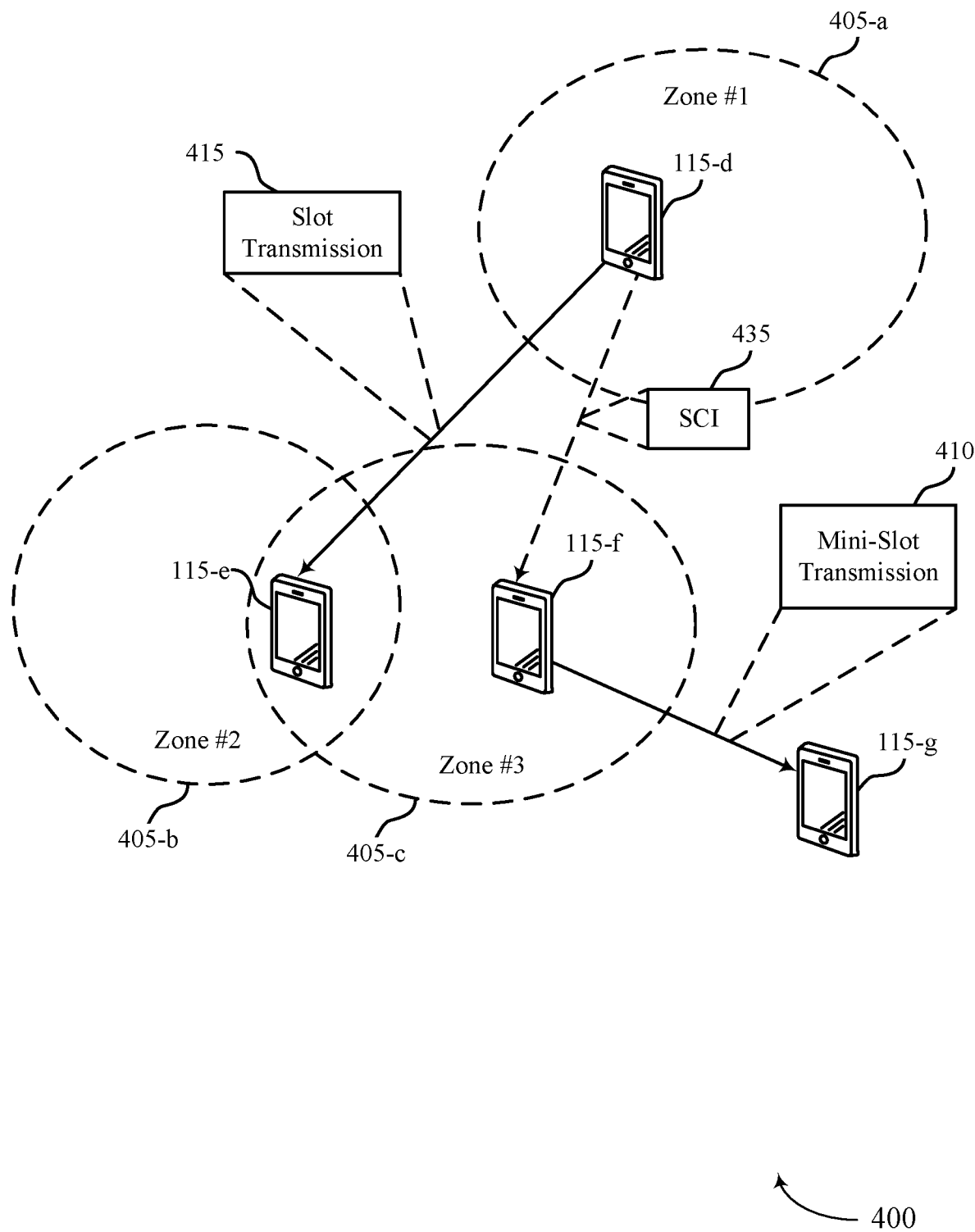
FIG. 4 illustrates an example of a zone configuration that supports full-slot transmission detection for sidelink communications in accordance with one or more aspects of the present disclosure.

FIG. 4 illustrates an example of a zone configuration 400 that supports full-slot transmission detection for sidelink communications in accordance with one or more aspects of the present disclosure. The zone configuration 400 may implement or be implemented by aspects of the wireless communications systems 100 and 200 described with reference to FIGS. 1 and 2. The zone configuration 400 illustrates communications between a UE 115-d, a UE 115-e, a UE 115-f, and a UE 115-g, which may represent aspects of corresponding devices as described with reference to FIGS. 1-3. Each UE 115 may be associated with (e.g., located within or assigned to) a respective zone 405, such as the zones 405-a, 405-b, and 405-c illustrated in FIG. 4. In some aspects, a sidelink UE 115 may determine whether to transmit a mini-slot transmission 410 based on two or more zone IDs.

The UE 115-d may be associated with a first zone 405-a (e.g., Zone #1). The first zone 405-a may correspond to a geographical area or region that includes the UE 115-d and one or more other UEs 115. The UE 115-d may transmit a slot transmission 415 to one or more other UEs 115, including the target receiving UE 115-e. The target receiving UE 115-e may be associated with a second zone 405-b (e.g., Zone #2), a third zone 405-c (e.g., Zone #3), or both. Although the first zone 405-a, the second zone 405-b, and the third zone 405-c are illustrated as separate zones 405 in the example of FIG. 4, it is to be understood that the transmitting UE 115-d and the target receiving UE 115-e may be in the same zone 405 or overlapping zones 405.

The UE 115-f may have sidelink data to transmit to the UE 115-g via a mini-slot transmission 410. The UE 115-f may perform an LBT procedure to identify available resources from a mini-slot resource pool to use for transmitting the mini-slot transmission 410. The available resources may be within a first subband, which may represent an example of the subband 350-b illustrated in FIG. 3. In some cases, the mini-slot transmission 410 transmitted by the UE 115-f may interfere with the slot transmission 415 being received by the UE 115-e. The mini-slot transmission 410 may interfere with the slot transmission 415 based on the mini-slot transmission 410 being transmitted via a subband that is adjacent to a subband via which the slot transmission 415 is transmitted, as described with reference to FIGS. 2 and 3. Additionally, or alternatively, the transmitting UE 115-f may be associated with the third zone 405-c that may also include the target receiving UE 115-e, or the third zone 405-c may be overlapping with or relatively close to the second zone 405-b associated with the target receiving UE 115-e. The mini-slot transmission 410 may cause interference at the UE 115-e due to the overlap between zones 405 and the proximity between the devices.

The UE 115-f may perform a slot transmission detection procedure as described herein prior to transmitting the mini-slot transmission 410 to improve throughput and reduce interference between transmissions. In the example of FIG. 4, the UE 115-f may perform the slot transmission detection procedure based on one or more zone IDs. The UE 115-f may monitor resources in one or more subbands for SCI 435, as described with reference to FIG. 3. The UE 115-*f* may detect SCI 435 transmitted by the UE 115-*d* and associated with the slot transmission 415. The SCI 435 may indicate a zone ID of the first zone 405-*a* associated with the transmitting UE 115-*d*, a zone ID of the second zone 405-*b* or the third zone 405-*c* associated with the target receiving UE 115-*e*, or both. The UE 115-*f* may decode the SCI 435 to determine the zone IDs. The SCI 435 may be a first stage SCI (SCI-1), a second stage SCI (SCI-2), or both. In some aspects, a zone ID of the first zone 405-*a* may be included in the first stage SCI 435 and a zone ID of the second zone 405-*b* may be included in the second stage SCI, or vice versa.

The UE 115-*f* may compare one or both of the zone IDs indicated via the SCI 435 with a zone ID of the zone 405-*c* associated with the UE 115-*f*. The UE 115-*f* may determine to backoff and refrain from transmitting the mini-slot transmission 410 to the UE 115-*g* in the same slot as the slot transmission 415 if one or both of the zone IDs indicated via the SCI 435 are the same as the zone ID of the third zone 405-*c* associated with the UE 115-*f* In one aspect, if the SCI 435 indicates that the zone ID of the third zone 405-*c* is associated with the target receiving UE 115-*e* for the slot transmission 415, the UE 115-*f* may refrain from transmitting the mini-slot transmission 410 in the same slot.

In some aspects, the UE 115-*f* may determine to backoff and refrain from transmitting the mini-slot transmission 410 in the same slot as the slot transmission 415 based on one or both of the zone IDs indicated via the SCI 435 being associated with zones 405 that are within a threshold distance of the third zone 405-*c* associated with the UE 115-*f* In this aspect, because the second zone 405-*b* overlaps with the third zone 405-*c*, the UE 115-*f* may determine to backoff if the SCI 435 indicates a zone ID of the second zone 405-*b*.

If the SCI 435 indicates zone IDs that are associated with zones 405 that are different than the third zone 405-*c* (e.g., non-overlapping with the zone 405-*c*), or more than a threshold distance from the third zone 405-*c*, or both, the UE 115-*f* may determine to transmit the mini-slot transmission 410 to the UE 115-*g* in the same slot as the slot transmission 415. In one aspect, the UE 115-*f* may determine that interference at the target receiving UE 115-*e* due to the mini-slot transmission 410 may be relatively minimal based on the zone ID of the zone 405-*c* being different than the zone ID of the zone 405-*b*.

The UE 115-*f* may thereby utilize zone IDs indicated via SCI 435 to detect slot transmissions 415 in one or more adjacent subbands and determine whether to transmit a mini-slot transmission 410 in a first subband. By utilizing zone IDs as described herein, the UE 115-*f* may refrain from interfering with ongoing slot transmissions 415, which may improve coordination between devices, throughput, and reliability of the sidelink communications.

Figure 5:
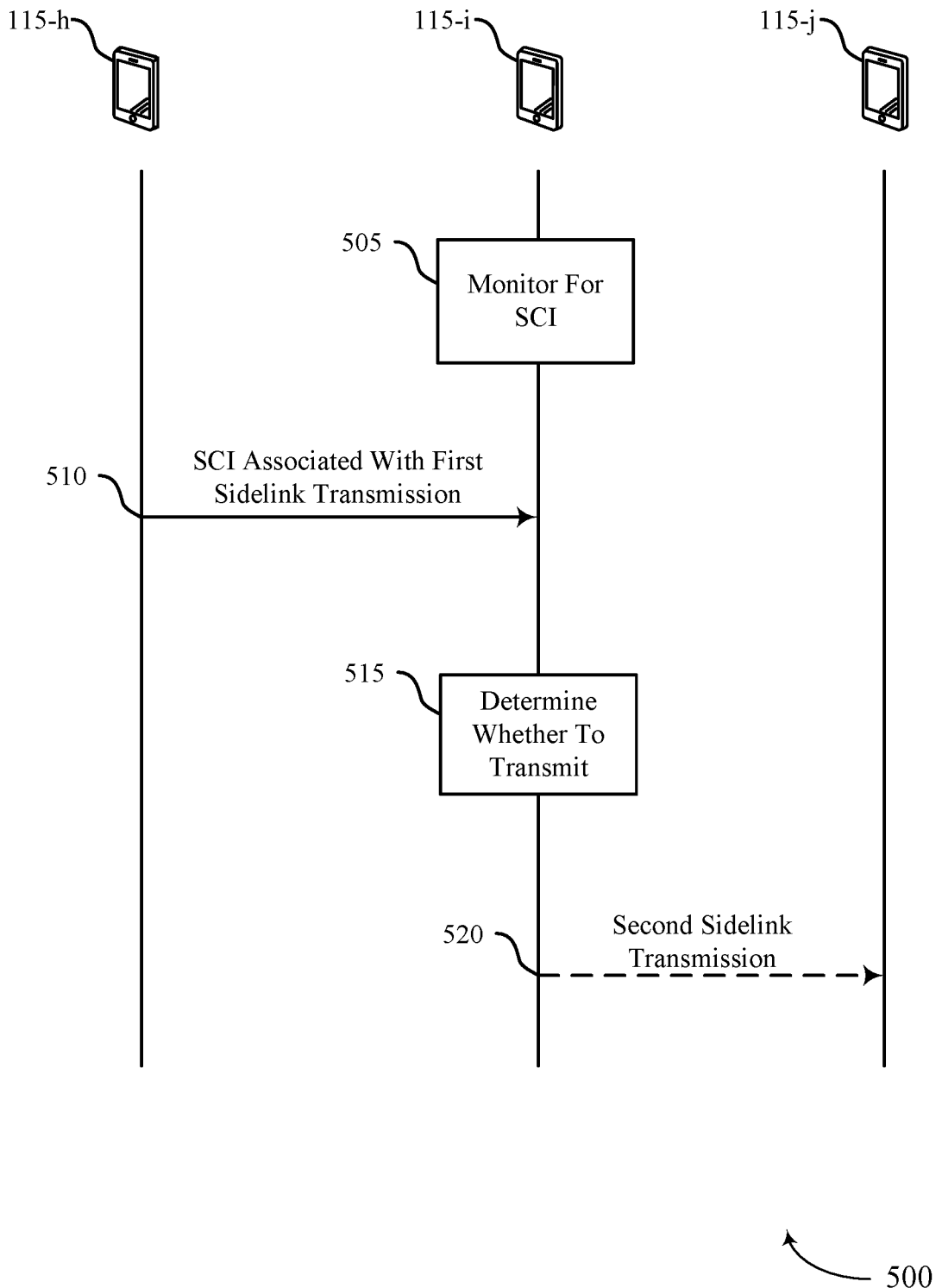
FIGS. 5 through 7 illustrate examples of process flows that support full-slot transmission detection for sidelink communications in accordance with one or more aspects of the present disclosure.

FIG. 5 illustrates an example of a process flow 500 that supports full-slot transmission detection for sidelink communications in accordance with one or more aspects of the present disclosure. The process flow 500 may implement or be implemented by aspects of the wireless communications systems 100 and 200 described with reference to FIGS. 1 and 2. The process flow 500 illustrates communications between a UE 115-*h*, a UE 115-*i*, and a UE 115-*j*, which may represent aspects of corresponding devices as described with reference to FIGS. 1-4. In some aspects, the UE 115-*i* may perform a slot transmission detection procedure to determine whether to backoff or transmit a mini-slot transmission.

In the following description of the process flow 500, the operations between the UEs 115-*h*, 115-*i*, and 115-*j* may be performed in different orders or at different times. Some operations may also be left out of the process flow 500, or other operations may be added. Although the UEs 115-*h*, 115-*i*, and 115-*j* are shown performing the operations of the process flow 500, some aspects of some operations may also be performed by one or more other wireless devices.

At 505, the UE 115-*i* may monitor, during a slot, for SCI associated with a first sidelink transmission that corresponds to first resources that span a duration of the slot. The first sidelink transmission corresponding to the first resources may be referred to as a slot transmission, in some aspects. The UE 115-*i* may monitor resources in one or more subbands for the SCI, as described with reference to FIGS. 2-4.

At 510, the UE 115-*i* may receive the SCI associated with the first sidelink transmission based on the monitoring. The SCI may indicate one or more parameters associated with the first sidelink transmission. In one aspect, the SCI may indicate a traffic priority of the first sidelink transmission, a zone ID of the UE 115-*h* or some other UE 115 that transmits the first sidelink transmission, a zone ID of a receiving UE 115 that is intended to receive the first sidelink transmission, a frequency resource allocation of the first sidelink transmission, a signal strength associated with the first sidelink transmission, or any combination thereof.

At 515, the UE 115-*i* may determine, based on the one or more parameters associated with the first sidelink transmission, whether to transmit a second sidelink transmission. The second sidelink transmission may have a duration that is less than a first duration of the first sidelink transmission and may correspond to second resources in the slot that are offset in time from a starting symbol of the first sidelink transmission (e.g., the second sidelink transmission may start in the middle of the slot). In some aspects, the second sidelink transmission may be referred to as a mini-slot transmission herein.

The UE 115-*i* may, in some aspects, measure an RSRP of the SCI and compare the measured RSRP with an RSRP threshold. The UE 115-*i* may determine whether to transmit the second sidelink transmission based on the comparing. Additionally, or alternatively, the UE 115-*i* may determine whether to transmit the second sidelink transmission based on a first traffic priority of the first sidelink transmission relative to a second traffic priority of the second sidelink transmission. In some other aspects, the UE 115-*i* may determine whether to transmit the second sidelink transmission based on a first zone ID associated with the first sidelink transmission and a second zone ID associated with the second sidelink transmission, as described with reference to FIG. 4.

At 520, in some aspects, the UE 115-*i* may transmit the second sidelink transmission to the UE 115-*j*. The UE 115-*i* may determine to transmit the second sidelink transmission based on the measured RSRP of the SCI being less than the RSRP threshold, or based on the first traffic priority of the first sidelink transmission being less than the second traffic priority of the second sidelink transmission, or based on the first zone ID associated with the first sidelink transmission being different than the second zone ID associated with the second sidelink transmission.

Figure 6:
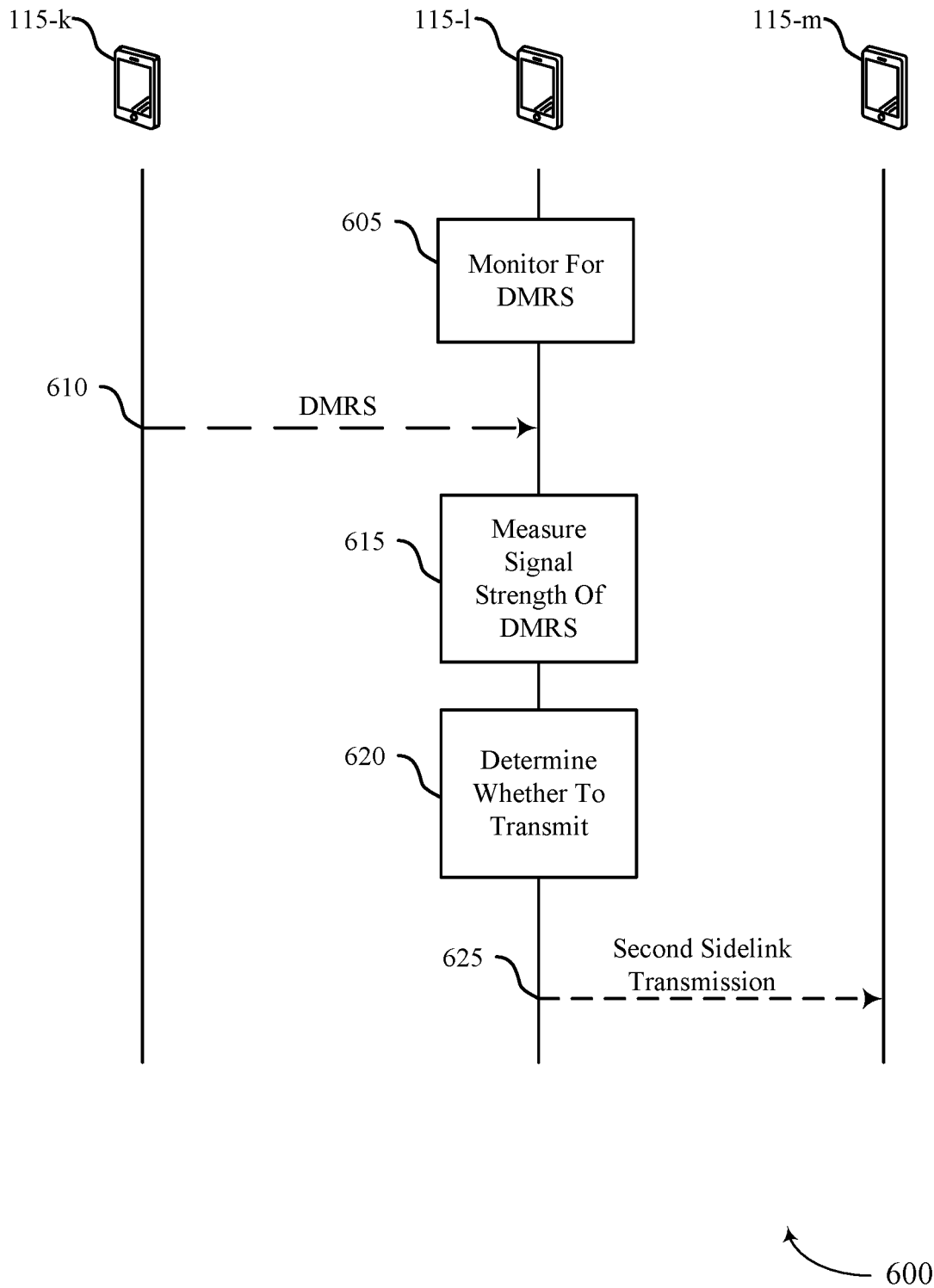

FIG. 6 illustrates an example of a process flow 600 that supports full-slot transmission detection for sidelink communications in accordance with one or more aspects of the present disclosure. The process flow 600 may implement or be implemented by aspects of the wireless communications systems 100 and 200 described with reference to FIGS. 1 and 2. The process flow 600 illustrates communications between a UE 115-k, a UE 115-l, and a UE 115-m, which may represent aspects of corresponding devices as described with reference to FIGS. 1-5. In some aspects, the UE 115-1 may perform a slot transmission detection procedure to determine whether to backoff or transmit a mini-slot transmission.

In the following description of the process flow 600, the operations between the UEs 115-k, 115-1, and 115-m may be performed in different orders or at different times. Some operations may also be left out of the process flow 600, or other operations may be added. Although the UEs 115-k, 115-1, and 115-m are shown performing the operations of the process flow 600, some aspects of some operations may also be performed by one or more other wireless devices.

At 605, the UE 115-1 may monitor one or more symbols in a slot for a DMRS associated with a first sidelink transmission that corresponds to first resources that span a duration of the slot. The first sidelink transmission corresponding to the first resources may be referred to as a slot transmission, in some aspects. The UE 115-1 may monitor resources in one or more subbands for the SCI, as described with reference to FIGS. 2-4.

At 610, in some aspects, the UE 115-1 may receive the DMRS associated with the first sidelink transmission from the UE 115-k based on the monitoring. The DMRS may represent an example of a preamble of the first sidelink transmission, in some aspects.

At 615, the UE 115-1 may measure a signal strength of the DMRS based on the monitoring. The signal strength may be an RSRP, or some other signal strength. In some aspects, the UE 115-1 may compare the measured signal strength with a signal strength threshold. In some aspects, the signal strength threshold may be based on a subband in which the DMRS is received, a traffic priority of the second sidelink transmission, or both, as described with reference to FIG. 3.

At 620, the UE 115-1 may determine, based on the measured signal strength of the DMRS, whether to transmit a second sidelink transmission. The second sidelink transmission may have a duration that is less than a first duration of the first sidelink transmission and may correspond to second resources in the slot that are offset in time from a starting symbol of the first sidelink transmission (e.g., the second sidelink transmission may start in the middle of the slot). In some aspects, the second sidelink transmission may be referred to as a mini-slot transmission herein. In some aspects, the UE 115-1 may determine whether to transmit the second sidelink transmission based on comparing the measured signal strength of the DMRS with the signal strength threshold.

At 625, in some aspects, the UE 115-1 may transmit the second sidelink transmission to the UE 115-m. The UE 115-1 may determine to transmit the second sidelink transmission based on the measured signal strength of the DMRS being less than the signal strength threshold, in some aspects.

Figure 7:
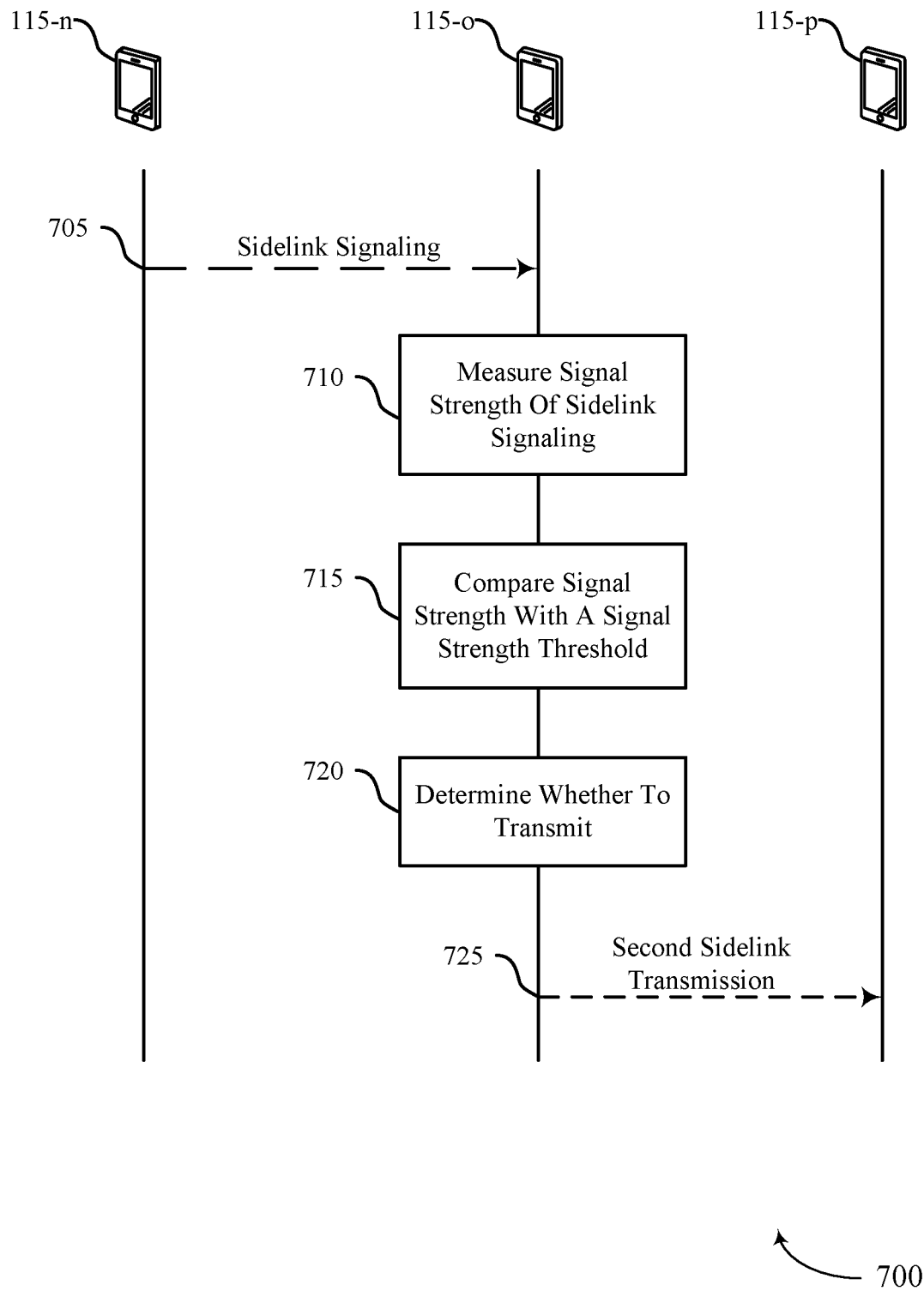

FIG. 7 illustrates an example of a process flow 700 that supports full-slot transmission detection for sidelink communications in accordance with one or more aspects of the present disclosure. The process flow 700 may implement or be implemented by aspects of the wireless communications systems 100 and 200 described with reference to FIGS. 1 and 2. The process flow 700 illustrates communications between a UE 115-n, a UE 115-o, and a UE 115-p, which may represent aspects of corresponding devices as described with reference to FIGS. 1-5. In some aspects, the UE 115-o may perform a slot transmission detection procedure to determine whether to backoff or transmit a mini-slot transmission.

In the following description of the process flow 700, the operations between the UEs 115-n, 115-o, and 115-p may be performed in different orders or at different times. Some operations may also be left out of the process flow 700, or other operations may be added. Although the UEs 115-n, 115-o, and 115-p are shown performing the operations of the process flow 700, some aspects of some operations may also be performed by one or more other wireless devices.

At 705, in some aspects, the UE 115-o may receive or detect sidelink signaling from the UE 115-n or one or more other UEs 115. The sidelink signaling may be detected across multiple subbands in a frequency domain.

At 710, the UE 115-o may measure a signal strength of the sidelink signaling received across the multiple adjacent subbands in the frequency domain. The sidelink signaling may be received via a sidelink communication link and within a first set of one or more symbols in a beginning portion of a slot (e.g., before a mini-slot is scheduled to start). In some aspects, the signal strength may be an RSRP, an RSSI, or both. In some aspects, measuring the signal strength of the sidelink signaling in each subband may be part of a respective LBT procedure. In one aspect, the UE 115-o may perform multiple LBT procedures across the multiple subbands, as described with reference to FIG. 3.

At 715, the UE 115-o may compare the measured signal strength of the sidelink signaling with a signal strength threshold (e.g., an energy detection threshold). The signal strength threshold may be indicated to the UE 115-o via control signaling or configured at the UE 115-o. In some aspects, different signal strength thresholds may be configured for different subbands, as described with reference to FIG. 3.

At 720, the UE 115-1 may determine, based on comparing the measured signal strength with the signal strength threshold, whether to transmit a second sidelink transmission via a first subband of the multiple adjacent subbands. The second sidelink transmission may correspond to resources in the slot that are offset in time from the first set of one or more symbols in the slot in which the UE 115-o detected the sidelink signaling (e.g., the second sidelink transmission may start in the middle of the slot). In some aspects, the second sidelink transmission may be referred to as a mini-slot transmission herein.

At 725, in some aspects, the UE 115-o may transmit the second sidelink transmission to the UE 115-p. The UE 115-o may determine to transmit the second sidelink transmission based on the measured signal strength of the sidelink signaling being less than the signal strength threshold in one or more of the adjacent subbands, in some aspects.

Figure 8:
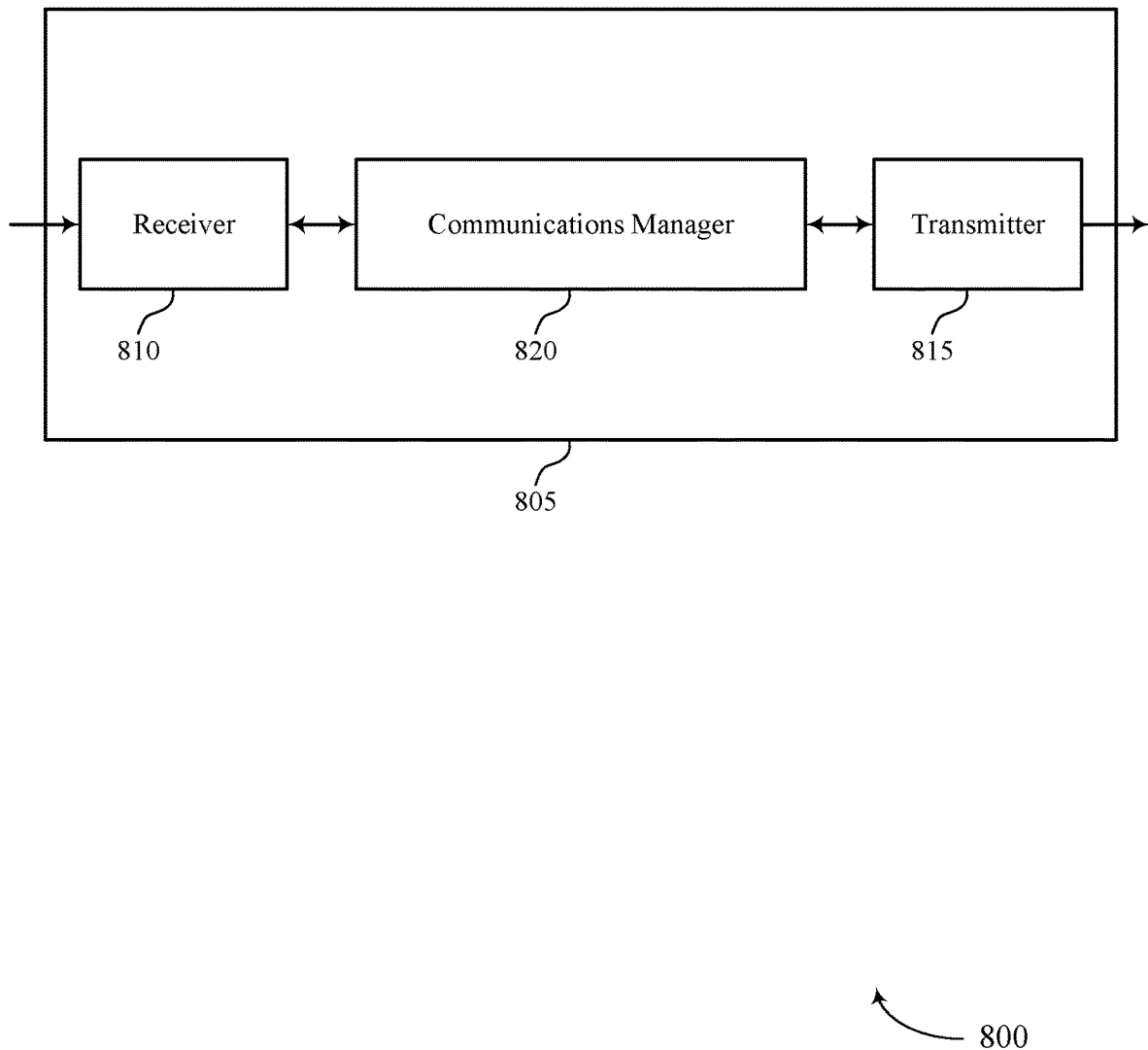
FIGS. 8 and 9 show block diagrams of devices that support full-slot transmission detection for sidelink communications in accordance with one or more aspects of the present disclosure.

FIG. 8 shows a block diagram 800 of a device 805 that supports full-slot transmission detection for sidelink communications in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to full-slot transmission detection for sidelink communications). Information may be passed on to other components of the device 805. The receiver 810 may utilize a single antenna or a set of multiple antennas.

The transmitter 815 may provide a means for transmitting signals generated by other components of the device 805. In one aspect, the transmitter 815 may transmit information such as packets, user data, control information, or any combination thereof associated with various information channels (e.g., control channels, data channels, information channels related to full-slot transmission detection for sidelink communications). In some aspects, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of full-slot transmission detection for sidelink communications as described herein. In one aspect, the communications manager 820, the receiver 810, the transmitter 815, or various combinations or components thereof may support a method for performing one or more of the functions described herein.

In some aspects, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 820 may be configured to perform various operations (e.g., receiving, obtaining, monitoring, outputting, transmitting) using or otherwise in cooperation with the receiver 810, the transmitter 815, or both. In one aspect, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication implemented by a first UE in accordance with aspects as disclosed herein. In one aspect, the communications manager 820 may be configured as or otherwise support a means for monitoring, during a slot, for SCI associated with a first sidelink transmission corresponding to first resources that span a duration of the slot. The communications manager 820 may be configured as or otherwise support a means for receiving the SCI based on the monitoring, the SCI indicating one or more parameters associated with the first sidelink transmission. The communications manager 820 may be configured as or otherwise support a means for determining, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission.

Additionally, or alternatively, the communications manager 820 may support wireless communication implemented by a first UE in accordance with aspects as disclosed herein. In one aspect, the communications manager 820 may be configured as or otherwise support a means for monitoring one or more symbols in a slot for a DMRS associated with a first sidelink transmission corresponding to first resources that span a duration of the slot. The communications manager 820 may be configured as or otherwise support a means for measuring a signal strength of the DMRS based on the monitoring. The communications manager 820 may be configured as or otherwise support a means for determining, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission.

Additionally, or alternatively, the communications manager 820 may support wireless communication implemented by a first UE in accordance with aspects as disclosed herein. In one aspect, the communications manager 820 may be configured as or otherwise support a means for measuring a signal strength of sidelink signaling received across a set of multiple adjacent subbands in a frequency domain and within a first set of one or more symbols in a beginning portion of a slot, the sidelink signaling received via a sidelink communication link. The communications manager 820 may be configured as or otherwise support a means for comparing the signal strength of the sidelink signaling with a signal strength threshold. The communications manager 820 may be configured as or otherwise support a means for determining, based on the comparing, whether to transmit a sidelink transmission via a first subband of the set of multiple adjacent subbands, the sidelink transmission corresponding to resources in the slot that are offset in time from the first set of one or more symbols in the slot.

By including or configuring the communications manager 820 in accordance with aspects as described herein, the device 805 (e.g., a processor controlling or otherwise coupled with the receiver 810, the transmitter 815, the communications manager 820, or a combination thereof) may support techniques for reduced processing, reduced power consumption, more efficient utilization of communication resources.

Figure 9:
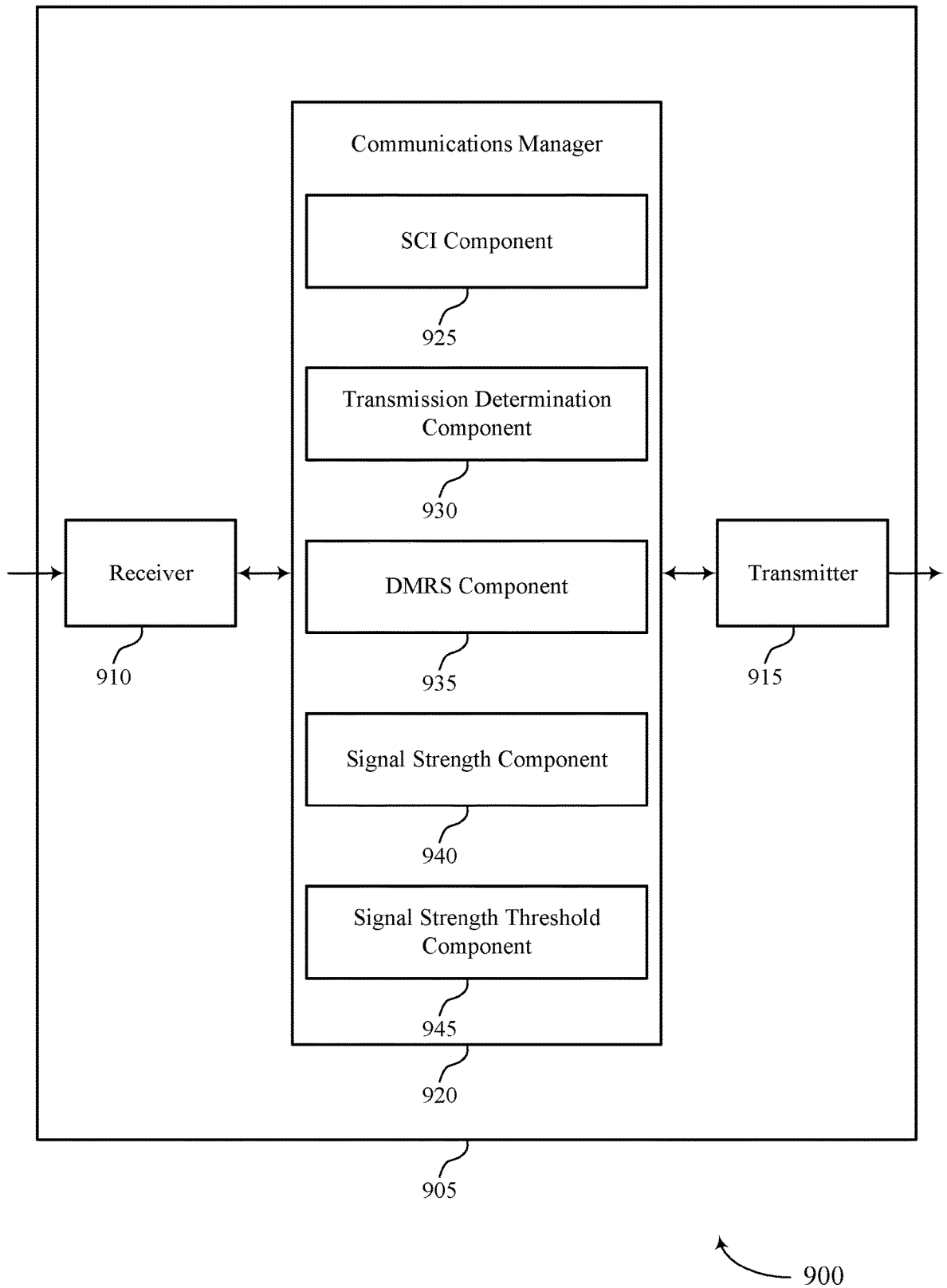

FIG. 9 shows a block diagram 900 of a device 905 that supports full-slot transmission detection for sidelink communications in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to full-slot transmission detection for sidelink communications). Information may be passed on to other components of the device 905. The receiver 910 may utilize a single antenna or a set of multiple antennas.

The transmitter 915 may provide a means for transmitting signals generated by other components of the device 905. In one aspect, the transmitter 915 may transmit information such as packets, user data, control information, or any combination thereof associated with various information channels (e.g., control channels, data channels, information channels related to full-slot transmission detection for sidelink communications). In some aspects, the transmitter 915 may be co-located with a receiver 910 in a transceiver module. The transmitter 915 may utilize a single antenna or a set of multiple antennas.

The device 905, or various components thereof, may be an example of means for performing various aspects of full-slot transmission detection for sidelink communications as described herein. In one aspect, the communications manager 920 may include an SCI component 925, a transmission determination component 930, a DMRS component 935, a signal strength component 940, a signal strength threshold component 945, or any combination thereof. The communications manager 920 may be an example of aspects of a communications manager 820 as described herein. In some aspects, the communications manager 920, or various components thereof, may be configured to perform various operations (e.g., receiving, obtaining, monitoring, outputting, transmitting) using or otherwise in cooperation with the receiver 910, the transmitter 915, or both. In one aspect, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication implemented by a first UE in accordance with aspects as disclosed herein. The SCI component 925 may be configured as or otherwise support a means for monitoring, during a slot, for SCI associated with a first sidelink transmission corresponding to first resources that span a duration of the slot. The SCI component 925 may be configured as or otherwise support a means for receiving the SCI based on the monitoring, the SCI indicating one or more parameters associated with the first sidelink transmission. The transmission determination component 930 may be configured as or otherwise support a means for determining, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission.

Additionally, or alternatively, the communications manager 920 may support wireless communication implemented by a first UE in accordance with aspects as disclosed herein. The DMRS component 935 may be configured as or otherwise support a means for monitoring one or more symbols in a slot for a DMRS associated with a first sidelink transmission corresponding to first resources that span a duration of the slot. The signal strength component 940 may be configured as or otherwise support a means for measuring a signal strength of the DMRS based on the monitoring. The transmission determination component 930 may be configured as or otherwise support a means for determining, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission.

Additionally, or alternatively, the communications manager 920 may support wireless communication implemented by a first UE in accordance with aspects as disclosed herein. The signal strength component 940 may be configured as or otherwise support a means for measuring a signal strength of sidelink signaling received across a set of multiple adjacent subbands in a frequency domain and within a first set of one or more symbols in a beginning portion of a slot, the sidelink signaling received via a sidelink communication link. The signal strength threshold component 945 may be configured as or otherwise support a means for comparing the signal strength of the sidelink signaling with a signal strength threshold. The transmission determination component 930 may be configured as or otherwise support a means for determining, based on the comparing, whether to transmit a sidelink transmission via a first subband of the set of multiple adjacent subbands, the sidelink transmission corresponding to resources in the slot that are offset in time from the first set of one or more symbols in the slot.

Figure 10:
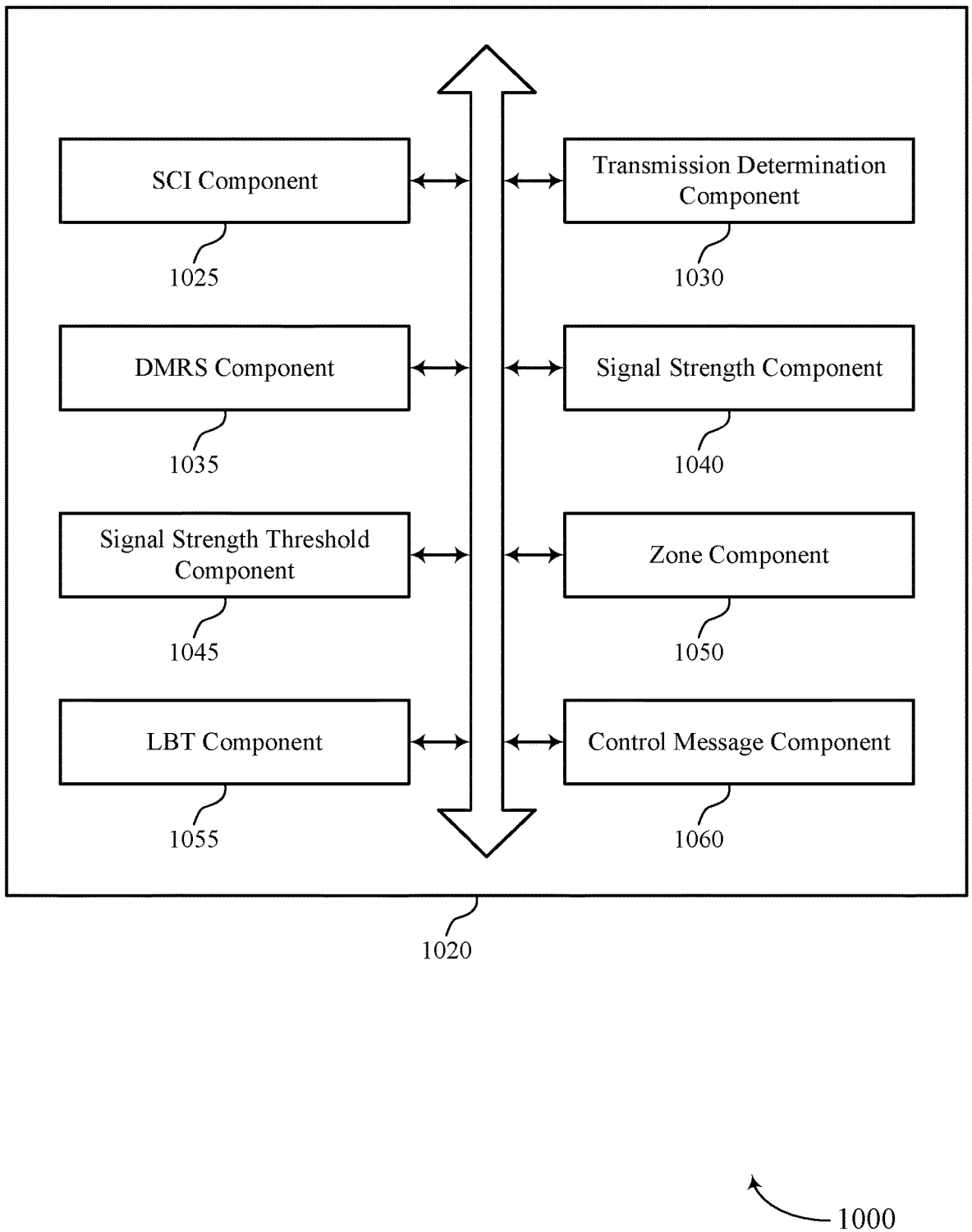
FIG. 10 shows a block diagram of a communications manager that supports full-slot transmission detection for sidelink communications in accordance with one or more aspects of the present disclosure.

FIG. 10 shows a block diagram 1000 of a communications manager 1020 that supports full-slot transmission detection for sidelink communications in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of full-slot transmission detection for sidelink communications as described herein. In one aspect, the communications manager 1020 may include an SCI component 1025, a transmission determination component 1030, a DMRS component 1035, a signal strength component 1040, a signal strength threshold component 1045, a zone component 1050, an LBT component 1055, a control message component 1060, or any combination thereof. Each of these components may communicate, directly or indirectly, with one another (e.g., via one or more buses).

The communications manager 1020 may support wireless communication implemented by a first UE in accordance with aspects as disclosed herein. The SCI component 1025 may be configured as or otherwise support a means for monitoring, during a slot, for SCI associated with a first sidelink transmission corresponding to first resources that span a duration of the slot. In some aspects, the SCI component 1025 may be configured as or otherwise support a means for receiving the SCI based on the monitoring, the SCI indicating one or more parameters associated with the first sidelink transmission. The transmission determination component 1030 may be configured as or otherwise support a means for determining, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission.

In some aspects, the signal strength component 1040 may be configured as or otherwise support a means for measuring an RSRP associated with the SCI. In some aspects, the signal strength threshold component 1045 may be configured as or otherwise support a means for comparing the measured RSRP with an RSRP threshold, where determining whether to transmit the second sidelink transmission is based on the comparing.

In some aspects, the transmission determination component 1030 may be configured as or otherwise support a means for transmitting the second sidelink transmission based on the measured RSRP being less than the RSRP threshold.

In some aspects, the one or more parameters indicated via the SCI include a first frequency allocation of the first resources associated with the first sidelink transmission. In some aspects, a value of the RSRP threshold is based on the first frequency allocation of the first resources and a second frequency allocation of the second resources associated with the second sidelink transmission. In some aspects, the one or more parameters indicated via the SCI include a first traffic priority associated with the first sidelink transmission. In some aspects, a value of the RSRP threshold is based on the first traffic priority and a second traffic priority associated with the second sidelink transmission.

In some aspects, the control message component 1060 may be configured as or otherwise support a means for receiving a control message that indicates a set of multiple RSRP thresholds each associated with a respective pair of first and second traffic priorities, where the respective traffic priority pairs include a first traffic priority associated with the first resources and a second traffic priority associated with the second resources. In some aspects, the signal strength threshold component 1045 may be configured as or otherwise support a means for selecting the RSRP threshold from the set of multiple RSRP thresholds based on the RSRP threshold corresponding to a pair of the first traffic priority associated with the first sidelink transmission and the second traffic priority associated with the second sidelink transmission.

In some aspects, the one or more parameters indicated via the SCI include a first traffic priority associated with the first sidelink transmission, and the transmission determination component 1030 may be configured as or otherwise support a means for transmitting the second sidelink transmission based on a second traffic priority associated with the second sidelink transmission being greater than the first traffic priority associated with the first sidelink transmission.

In some aspects, the one or more parameters indicated via the SCI include a first zone ID associated with the first sidelink transmission, and the zone component 1050 may be configured as or otherwise support a means for comparing the first zone ID associated with the first sidelink transmission with a second zone ID of the first UE, the first zone ID associated with a second UE that transmits the first sidelink transmission, a third UE that receives the first sidelink transmission, or both, where the determining whether to transmit the second sidelink transmission is based on the comparing. In some aspects, the transmission determination component 1030 may be configured as or otherwise support a means for transmitting the second sidelink transmission based on the first zone ID being different than the second zone ID.

In some aspects, the LBT component 1055 may be configured as or otherwise support a means for performing a LBT procedure, where the monitoring for the SCI is based on a success of the LBT procedure.

In some aspects, to support monitoring for the SCI, the SCI component 1025 may be configured as or otherwise support a means for monitoring for the SCI within a first set of RBs that are overlapping, partially overlapping, or non-overlapping in a frequency domain with a second set of RBs allocated for the second sidelink transmission. In some aspects, the SCI includes first stage SCI, second stage SCI, or both.

Additionally, or alternatively, the communications manager 1020 may support wireless communication implemented by a first UE in accordance with aspects as disclosed herein. The DMRS component 1035 may be configured as or otherwise support a means for monitoring one or more symbols in a slot for a DMRS associated with a first sidelink transmission corresponding to first resources that span a duration of the slot. The signal strength component 1040 may be configured as or otherwise support a means for measuring a signal strength of the DMRS based on the monitoring. In some aspects, the transmission determination component 1030 may be configured as or otherwise support a means for determining, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission.

In some aspects, the signal strength threshold component 1045 may be configured as or otherwise support a means for comparing the measured signal strength with a signal strength threshold, where determining whether to transmit the second sidelink transmission is based on the comparing. In some aspects, the transmission determination component 1030 may be configured as or otherwise support a means for transmitting the second sidelink transmission based on the measured signal strength being less than the signal strength threshold.

In some aspects, the signal strength threshold component 1045 may be configured as or otherwise support a means for selecting, from a set of multiple signal strength thresholds each associated with a respective traffic priority, the signal strength threshold based on a traffic priority of the second sidelink transmission.

In some aspects, to support monitoring, the DMRS component 1035 may be configured as or otherwise support a means for monitoring for the DMRS within a first set of RBs that are overlapping, partially overlapping, or non-overlapping in a frequency domain with a second set of RBs allocated for the second sidelink transmission. In some aspects, the DMRS component 1035 may be configured as or otherwise support a means for receiving the DMRS via the first set of RBs, where the DMRS indicates a third set of RBs allocated for the first sidelink transmission, the third set of RBs overlapping, partially overlapping, or non-overlapping in the frequency domain with the second set of RBs allocated for the second sidelink transmission.

In some aspects, to support monitoring, the DMRS component 1035 may be configured as or otherwise support a means for monitoring PSCCH resources for the DMRS, where the DMRS includes a preamble for the first sidelink transmission. In some aspects, the signal strength includes an RSRP.

Additionally, or alternatively, the communications manager 1020 may support wireless communication implemented by a first UE in accordance with aspects as disclosed herein. In some aspects, the signal strength component 1040 may be configured as or otherwise support a means for measuring a signal strength of sidelink signaling received across a set of multiple adjacent subbands in a frequency domain and within a first set of one or more symbols in a beginning portion of a slot, the sidelink signaling received via a sidelink communication link. The signal strength threshold component 1045 may be configured as or otherwise support a means for comparing the signal strength of the sidelink signaling with a signal strength threshold. In some aspects, the transmission determination component 1030 may be configured as or otherwise support a means for determining, based on the comparing, whether to transmit a sidelink transmission via a first subband of the set of multiple adjacent subbands, the sidelink transmission corresponding to resources in the slot that are offset in time from the first set of one or more symbols in the slot.

In some aspects, the transmission determination component 1030 may be configured as or otherwise support a means for transmitting the sidelink transmission based on the signal strength of the sidelink signaling being less than the signal strength threshold.

In some aspects, to support comparing, the signal strength threshold component 1045 may be configured as or otherwise support a means for comparing a respective signal strength of the sidelink signaling received via each subband of the set of multiple adjacent subbands with a respective signal strength threshold of a set of multiple signal strength thresholds, where signal strength thresholds associated with each subband of the set of multiple adjacent subbands are different.

In some aspects, a value of a first signal strength threshold associated with the first subband via which the sidelink transmission is scheduled is less than values of second signal strength thresholds of the set of multiple signal strength thresholds.

In some aspects, the LBT component 1055 may be configured as or otherwise support a means for performing a first LBT procedure for channel access. In some aspects, the LBT component 1055 may be configured as or otherwise support a means for performing a second LBT procedure based on a success of the first LBT procedure, where the measuring the signal strength of the sidelink signaling is based on performing the second LBT procedure. In some aspects, the signal strength corresponds to an RSSI and the signal strength threshold corresponds to an energy detection threshold.

Figure 11:
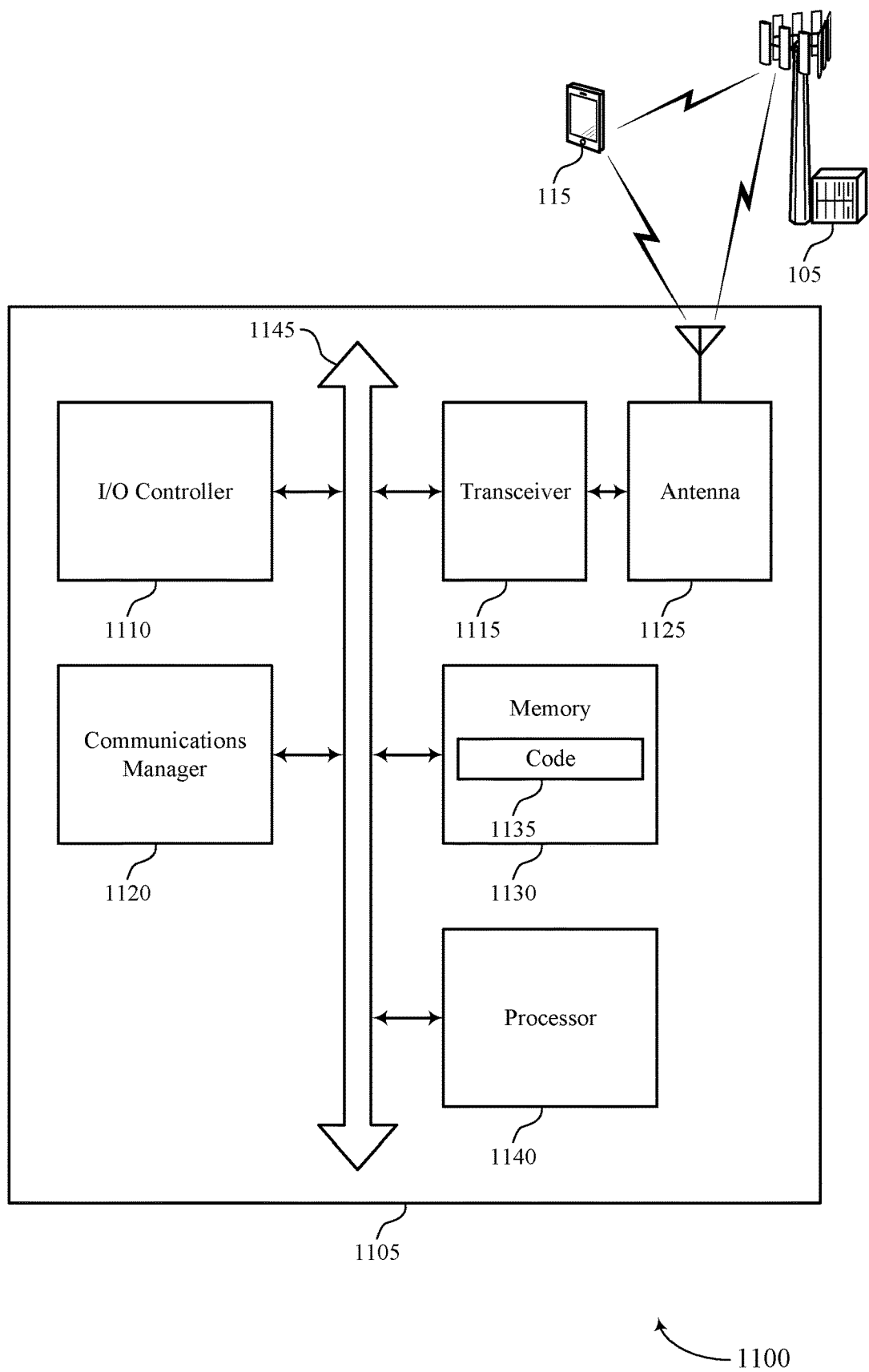
FIG. 11 shows a diagram of a system including a device that supports full-slot transmission detection for sidelink communications in accordance with one or more aspects of the present disclosure.

FIG. 11 shows a diagram of a system 1100 including a device 1105 that supports full-slot transmission detection for sidelink communications in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. In one aspect, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting full-slot transmission detection for sidelink communications). In one aspect, the device 1105 or a component of the device 1105 may include a processor 1140 and memory 1130 coupled with or to the processor 1140, the processor 1140 and memory 1130 configured to perform various functions described herein.

The communications manager 1120 may support wireless communication implemented by a first UE in accordance with aspects as disclosed herein. In one aspect, the communications manager 1120 may be configured as or otherwise support a means for monitoring, during a slot, for SCI associated with a first sidelink transmission corresponding to first resources that span a duration of the slot. The communications manager 1120 may be configured as or otherwise support a means for receiving the SCI based on the monitoring, the SCI indicating one or more parameters associated with the first sidelink transmission. The communications manager 1120 may be configured as or otherwise support a means for determining, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission.

Additionally, or alternatively, the communications manager 1120 may support wireless communication implemented by a first UE in accordance with aspects as disclosed herein. In one aspect, the communications manager 1120 may be configured as or otherwise support a means for monitoring one or more symbols in a slot for a DMRS associated with a first sidelink transmission corresponding to first resources that span a duration of the slot. The communications manager 1120 may be configured as or otherwise support a means for measuring a signal strength of the DMRS based on the monitoring. The communications manager 1120 may be configured as or otherwise support a means for determining, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission.

Additionally, or alternatively, the communications manager 1120 may support wireless communication implemented by a first UE in accordance with aspects as disclosed herein. In one aspect, the communications manager 1120 may be configured as or otherwise support a means for measuring a signal strength of sidelink signaling received across a set of multiple adjacent subbands in a frequency domain and within a first set of one or more symbols in a beginning portion of a slot, the sidelink signaling received via a sidelink communication link. The communications manager 1120 may be configured as or otherwise support a means for comparing the signal strength of the sidelink signaling with a signal strength threshold. The communications manager 1120 may be configured as or otherwise support a means for determining, based on the comparing, whether to transmit a sidelink transmission via a first subband of the set of multiple adjacent subbands, the sidelink transmission corresponding to resources in the slot that are offset in time from the first set of one or more symbols in the slot.

By including or configuring the communications manager 1120 in accordance with aspects as described herein, the device 1105 may support techniques for improved communication reliability, reduced latency, reduced power consumption, more efficient utilization of communication resources, and improved coordination between devices.

In some aspects, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some aspects, one or more functions described with reference to the communications manager 1120 may be supported by or performed by the processor 1140, the memory 1130, the code 1135, or any combination thereof. In one aspect, the code 1135 may include instructions executable by the processor 1140 to cause the device 1105 to perform various aspects of full-slot transmission detection for sidelink communications as described herein, or the processor 1140 and the memory 1130 may be otherwise configured to perform or support such operations.

Figure 12:
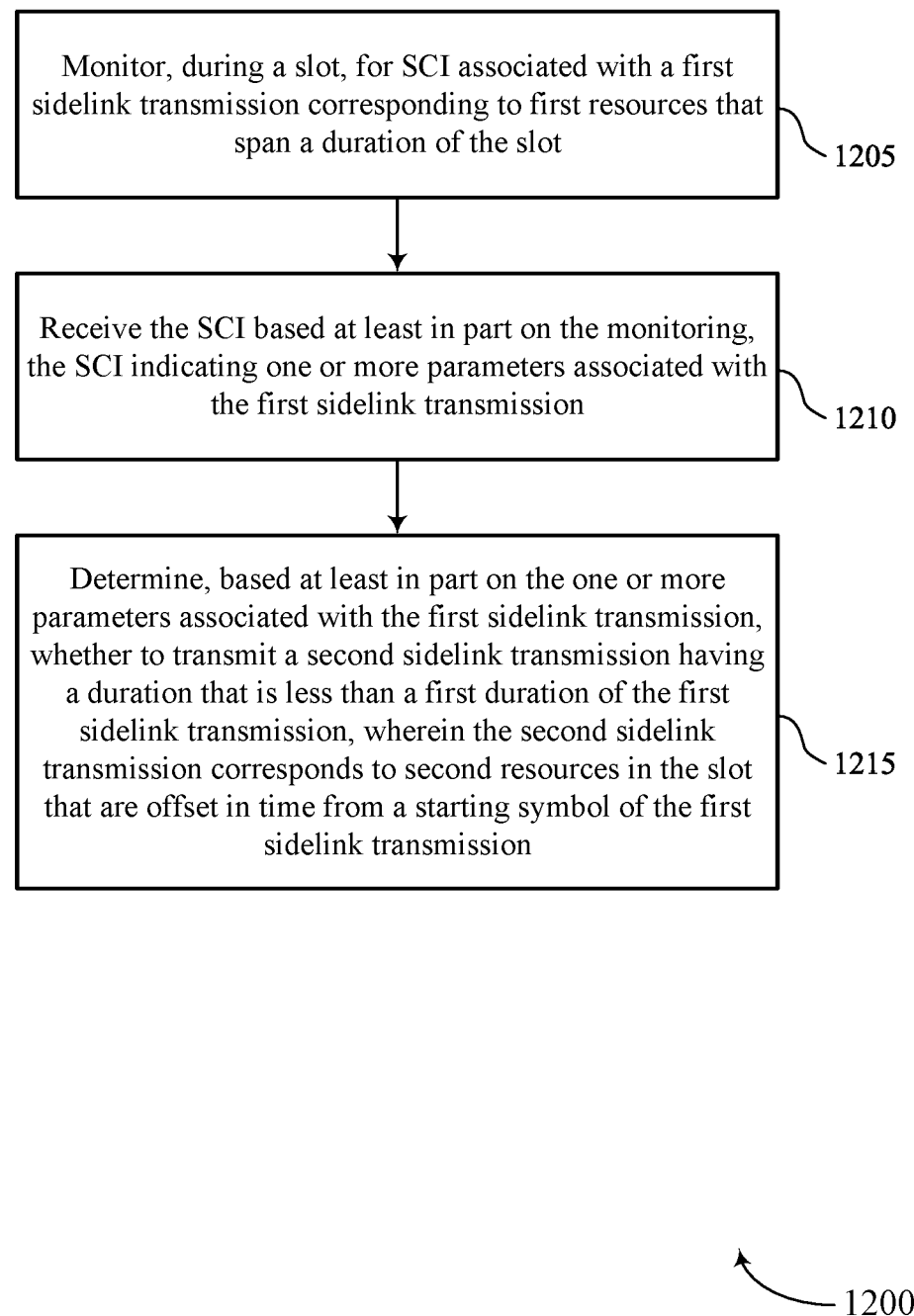
FIGS. 12 through 17 show flowcharts illustrating methods that support full-slot transmission detection for sidelink communications in accordance with one or more aspects of the present disclosure.

FIG. 12 shows a flowchart illustrating a method 1200 that supports full-slot transmission detection for sidelink communications in accordance with one or more aspects of the present disclosure. The operations of the method 1200 may be implemented by a UE or its components as described herein. In one aspect, the operations of the method 1200 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1205, the method may include monitoring, during a slot, for SCI associated with a first sidelink transmission corresponding to first resources that span a duration of the slot. The operations of 1205 may be performed in accordance with aspects as disclosed herein. In some aspects, aspects of the operations of 1205 may be performed by an SCI component 1025 as described with reference to FIG. 10.

At 1210, the method may include receiving the SCI based on the monitoring, the SCI indicating one or more parameters associated with the first sidelink transmission. The operations of 1210 may be performed in accordance with aspects as disclosed herein. In some aspects, aspects of the operations of 1210 may be performed by an SCI component 1025 as described with reference to FIG. 10.

At 1215, the method may include determining, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission. The operations of 1215 may be performed in accordance with aspects as disclosed herein. In some aspects, aspects of the operations of 1215 may be performed by a transmission determination component 1030 as described with reference to FIG. 10.

Figure 13:
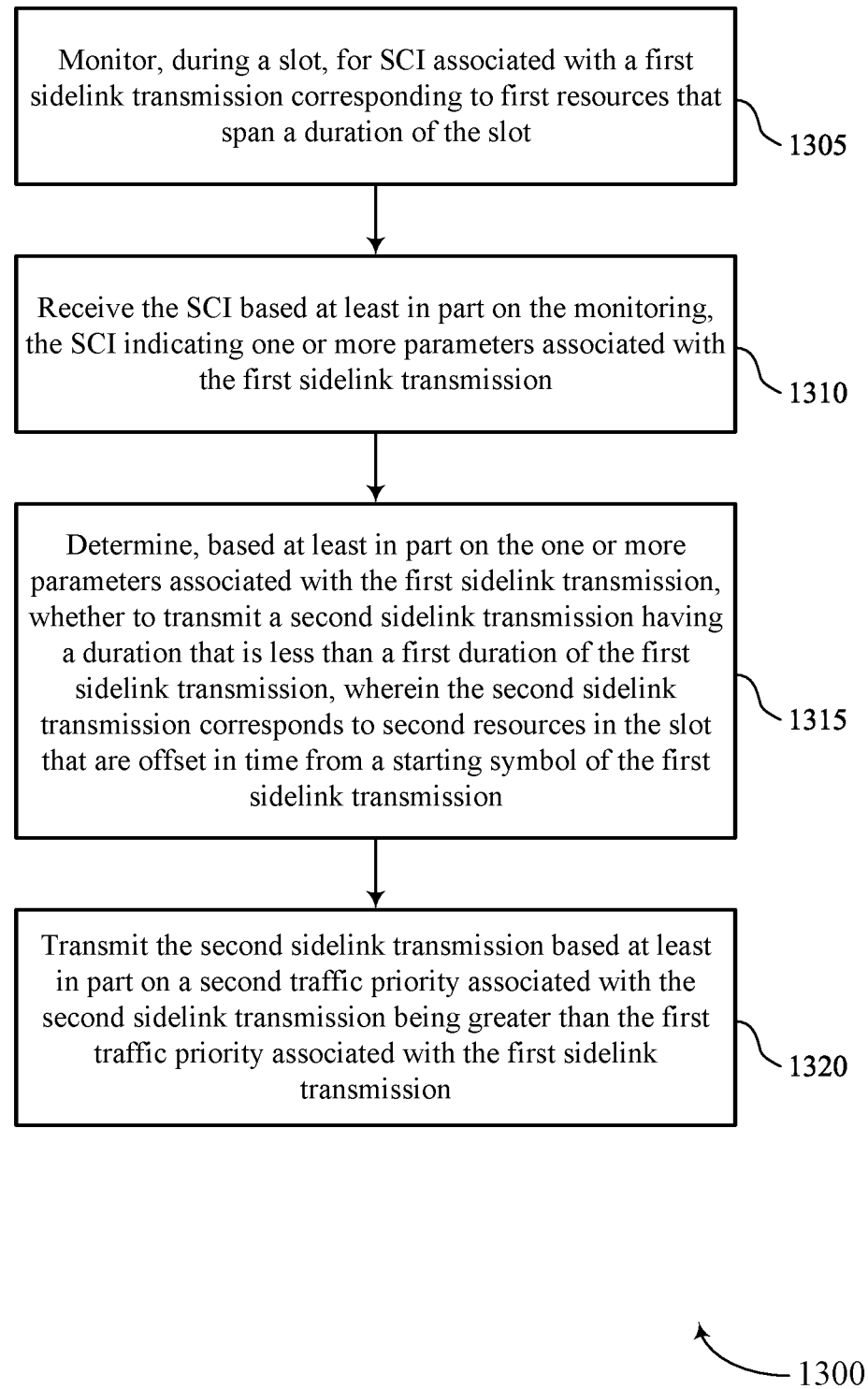

FIG. 13 shows a flowchart illustrating a method 1300 that supports full-slot transmission detection for sidelink communications in accordance with one or more aspects of the present disclosure. The operations of the method 1300 may be implemented by a UE or its components as described herein. In one aspect, the operations of the method 1300 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1305, the method may include monitoring, during a slot, for SCI associated with a first sidelink transmission corresponding to first resources that span a duration of the slot. The operations of 1305 may be performed in accordance with aspects as disclosed herein. In some aspects, aspects of the operations of 1305 may be performed by an SCI component 1025 as described with reference to FIG. 10.

At 1310, the method may include receiving the SCI based on the monitoring, the SCI indicating one or more parameters associated with the first sidelink transmission. The operations of 1310 may be performed in accordance with aspects as disclosed herein. In some aspects, aspects of the operations of 1310 may be performed by an SCI component 1025 as described with reference to FIG. 10.

At 1315, the method may include determining, based on the one or more parameters associated with the first sidelink transmission, whether to transmit a second sidelink transmission having a duration that is less than a first duration of the first sidelink transmission, where the second sidelink transmission corresponds to second resources in the slot that are offset in time from a starting symbol of the first sidelink transmission. The operations of 1315 may be performed in accordance with aspects as disclosed herein. In some aspects, aspects of the operations of 1315 may be performed by a transmission determination component 1030 as described with reference to FIG. 10.

At 1320, the method may include transmitting the second sidelink transmission based on a second traffic priority associated with the second sidelink transmission being greater than the first traffic priority associated with the first sidelink transmission. The operations of 1320 may be performed in accordance with aspects as disclosed herein. In some aspects, aspects of the operations of 1320 may be performed by a transmission determination component 1030 as described with reference to FIG. 10.

Figure 14:
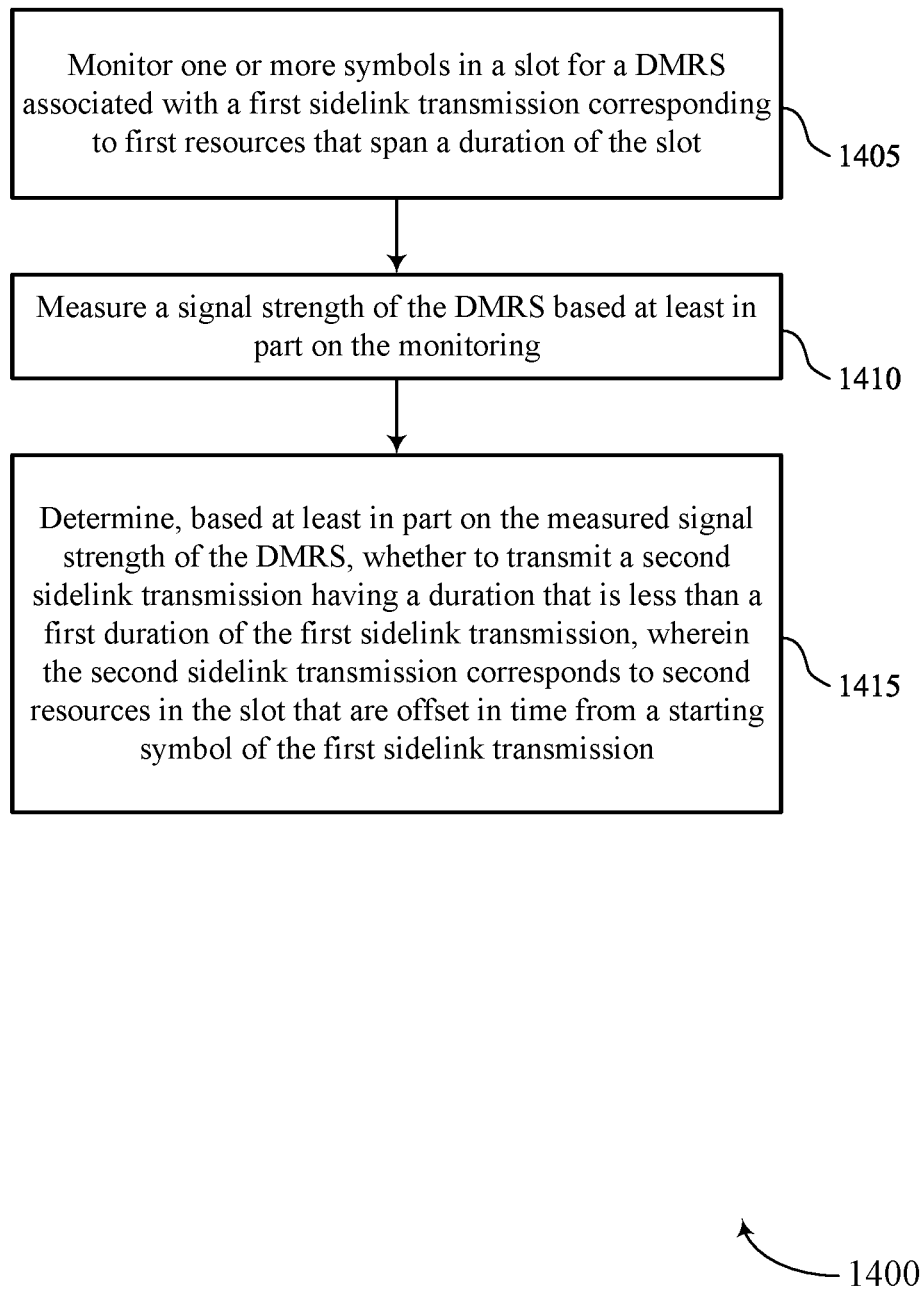

FIG. 14 shows a flowchart illustrating a method 1400 that supports full-slot transmission detection for sidelink communications in accordance with one or more aspects of the present disclosure. The operations of the method 1400 may be implemented by a UE or its components as described herein. In one aspect, the operations of the method 1400 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1405, the method may include monitoring one or more symbols in a slot for a DMRS associated with a first sidelink transmission corresponding to first resources that span a duration of the slot. The operations of 1405 may be performed in accordance with aspects as disclosed herein. In some aspects, aspects of the operations of 1405 may be performed by a DMRS component 1035 as described with reference to FIG. 10.

At 1410, the method may include measuring a signal strength of the DMRS based on the monitoring. The operations of 1410 may be performed in accordance with aspects as disclosed herein. In some aspects, aspects of the operations of 1410 may be performed by a signal strength component 1040 as described with reference to FIG. 10.

At 1415, the method may include determining, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission. The operations of 1415 may be performed in accordance with aspects as disclosed herein. In some aspects, aspects of the operations of 1415 may be performed by a transmission determination component 1030 as described with reference to FIG. 10.

Figure 15:
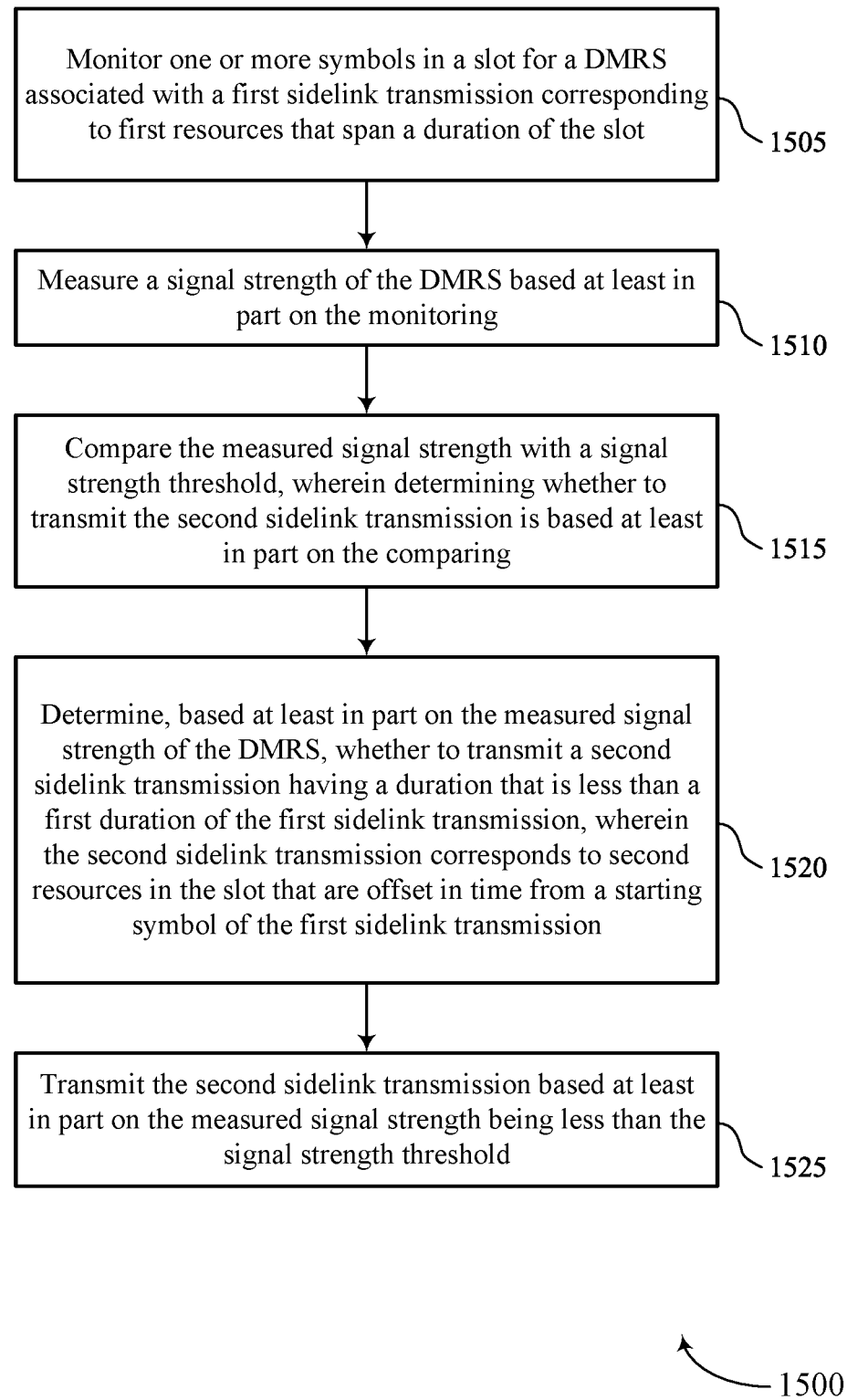

FIG. 15 shows a flowchart illustrating a method 1500 that supports full-slot transmission detection for sidelink communications in accordance with one or more aspects of the present disclosure. The operations of the method 1500 may be implemented by a UE or its components as described herein. In one aspect, the operations of the method 1500 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1505, the method may include monitoring one or more symbols in a slot for a DMRS associated with a first sidelink transmission corresponding to first resources that span a duration of the slot. The operations of 1505 may be performed in accordance with aspects as disclosed herein. In some aspects, aspects of the operations of 1505 may be performed by a DMRS component 1035 as described with reference to FIG. 10.

At 1510, the method may include measuring a signal strength of the DMRS based on the monitoring. The operations of 1510 may be performed in accordance with aspects as disclosed herein. In some aspects, aspects of the operations of 1510 may be performed by a signal strength component 1040 as described with reference to FIG. 10.

At 1515, the method may include comparing the measured signal strength with a signal strength threshold, where determining whether to transmit the second sidelink transmission is based on the comparing. The operations of 1515 may be performed in accordance with aspects as disclosed herein. In some aspects, aspects of the operations of 1515 may be performed by a signal strength threshold component 1045 as described with reference to FIG. 10.

At 1520, the method may include determining, based on the measured signal strength of the DMRS, whether to transmit a second sidelink transmission having a duration that is less than a first duration of the first sidelink transmission, where the second sidelink transmission corresponds to second resources in the slot that are offset in time from a starting symbol of the first sidelink transmission. The operations of 1520 may be performed in accordance with aspects as disclosed herein. In some aspects, aspects of the operations of 1520 may be performed by a transmission determination component 1030 as described with reference to FIG. 10.

At 1525, the method may include transmitting the second sidelink transmission based on the measured signal strength being less than the signal strength threshold. The operations of 1525 may be performed in accordance with aspects as disclosed herein. In some aspects, aspects of the operations of 1525 may be performed by a transmission determination component 1030 as described with reference to FIG. 10.

Figure 16:
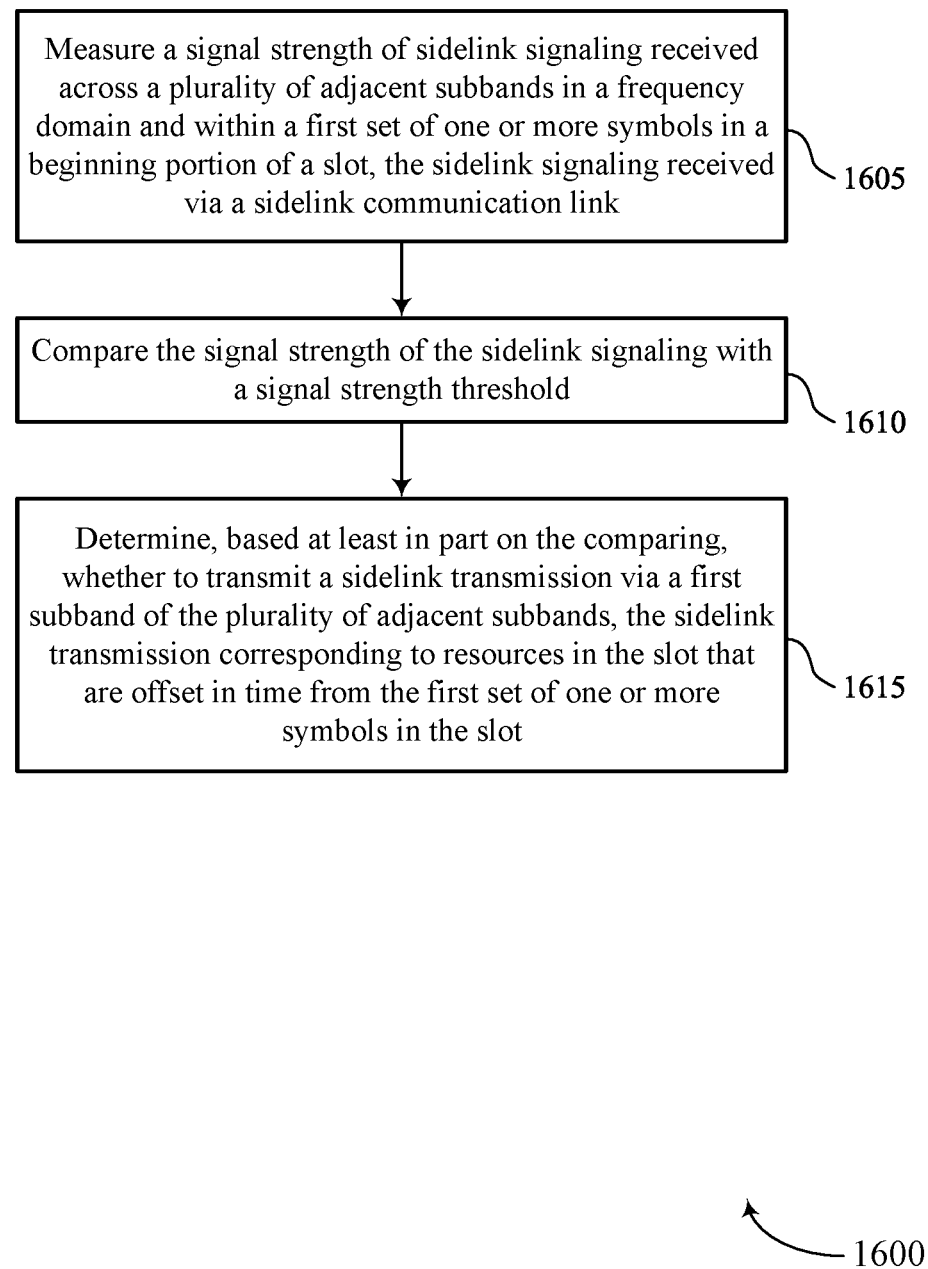

FIG. 16 shows a flowchart illustrating a method 1600 that supports full-slot transmission detection for sidelink communications in accordance with one or more aspects of the present disclosure. The operations of the method 1600 may be implemented by a UE or its components as described herein. In one aspect, the operations of the method 1600 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1605, the method may include measuring a signal strength of sidelink signaling received across a set of multiple adjacent subbands in a frequency domain and within a first set of one or more symbols in a beginning portion of a slot, the sidelink signaling received via a sidelink communication link. The operations of 1605 may be performed in accordance with aspects as disclosed herein. In some aspects, aspects of the operations of 1605 may be performed by a signal strength component 1040 as described with reference to FIG. 10.

At 1610, the method may include comparing the signal strength of the sidelink signaling with a signal strength threshold. The operations of 1610 may be performed in accordance with aspects as disclosed herein. In some aspects, aspects of the operations of 1610 may be performed by a signal strength threshold component 1045 as described with reference to FIG. 10.

At 1615, the method may include determining, based on the comparing, whether to transmit a sidelink transmission via a first subband of the set of multiple adjacent subbands, the sidelink transmission corresponding to resources in the slot that are offset in time from the first set of one or more symbols in the slot. The operations of 1615 may be performed in accordance with aspects as disclosed herein. In some aspects, aspects of the operations of 1615 may be performed by a transmission determination component 1030 as described with reference to FIG. 10.

Figure 17:
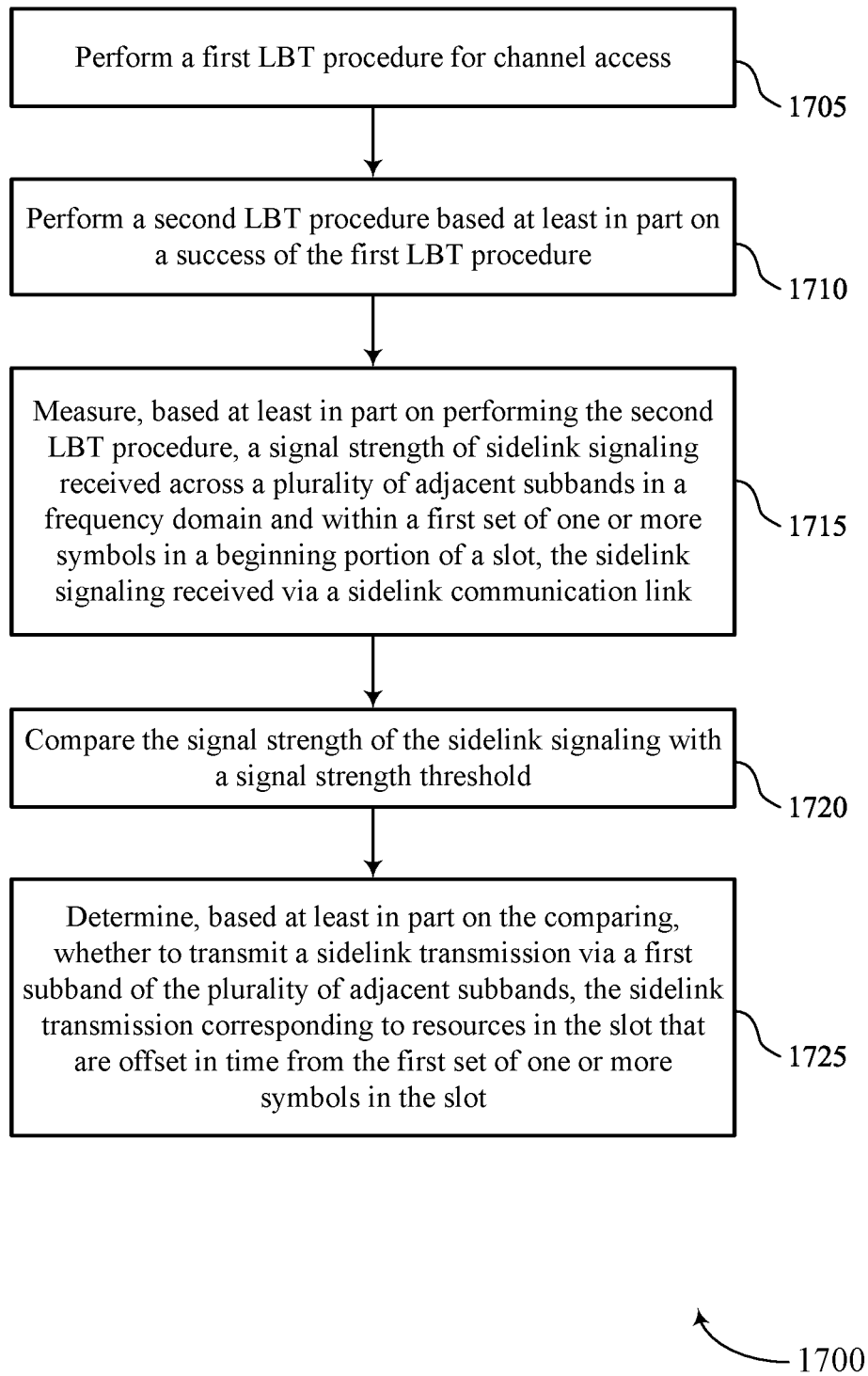

FIG. 17 shows a flowchart illustrating a method 1700 that supports full-slot transmission detection for sidelink communications in accordance with one or more aspects of the present disclosure. The operations of the method 1700 may be implemented by a UE or its components as described herein. In one aspect, the operations of the method 1700 may be performed by a UE 115 as described with reference to FIGS. 1 through 11. In some aspects, a UE may execute a set of instructions to control the functional elements of the UE to perform the described functions. Additionally, or alternatively, the UE may perform aspects of the described functions using special-purpose hardware.

At 1705, the method may include performing a first LBT procedure for channel access. The operations of 1705 may be performed in accordance with aspects as disclosed herein. In some aspects, aspects of the operations of 1705 may be performed by an LBT component 1055 as described with reference to FIG. 10.

At 1710, the method may include performing a second LBT procedure based on a success of the first LBT procedure. The operations of 1710 may be performed in accordance with aspects as disclosed herein. In some aspects, aspects of the operations of 1710 may be performed by an LBT component 1055 as described with reference to FIG. 10.

At 1715, the method may include measuring, based on performing the second LBT procedure, a signal strength of sidelink signaling received across a set of multiple adjacent subbands in a frequency domain and within a first set of one or more symbols in a beginning portion of a slot, the sidelink signaling received via a sidelink communication link. The operations of 1715 may be performed in accordance with aspects as disclosed herein. In some aspects, aspects of the operations of 1715 may be performed by a signal strength component 1040 as described with reference to FIG. 10.

At 1720, the method may include comparing the signal strength of the sidelink signaling with a signal strength threshold. The operations of 1720 may be performed in accordance with aspects as disclosed herein. In some aspects, aspects of the operations of 1720 may be performed by a signal strength threshold component 1045 as described with reference to FIG. 10.

At 1725, the method may include determining, based on the comparing, whether to transmit a sidelink transmission via a first subband of the set of multiple adjacent subbands, the sidelink transmission corresponding to resources in the slot that are offset in time from the first set of one or more symbols in the slot. The operations of 1725 may be performed in accordance with aspects as disclosed herein. In some aspects, aspects of the operations of 1725 may be performed by a transmission determination component 1030 as described with reference to FIG. 10.

The following provides an overview of aspects of the present disclosure:

Aspect 1: A method for wireless communication implemented by a first UE, comprising: monitoring, during a slot, for SCI associated with a first sidelink transmission corresponding to first resources that span a duration of the slot; receiving the SCI based at least in part on the monitoring, the SCI indicating one or more parameters associated with the first sidelink transmission; and determining, based at least in part on the one or more parameters associated with the first sidelink transmission, whether to transmit a second sidelink transmission having a duration that is less than a first duration of the first sidelink transmission, wherein the second sidelink transmission corresponds to second resources in the slot that are offset in time from a starting symbol of the first sidelink transmission.

Aspect 2: The method of aspect 1, further comprising: measuring an RSRP associated with the SCI; and comparing the measured RSRP with an RSRP threshold, wherein determining whether to transmit the second sidelink transmission is based at least in part on the comparing.

Aspect 3: The method of aspect 2, further comprising: transmitting the second sidelink transmission based at least in part on the measured RSRP being less than the RSRP threshold.

Aspect 4: The method of any of aspects 2 through 3, wherein: the one or more parameters indicated via the SCI comprise a first frequency allocation of the first resources associated with the first sidelink transmission; and a value of the RSRP threshold is based at least in part on the first frequency allocation of the first resources and a second frequency allocation of the second resources associated with the second sidelink transmission.

Aspect 5: The method of any of aspects 2 through 3, wherein the one or more parameters indicated via the SCI comprise a first traffic priority associated with the first sidelink transmission; and a value of the RSRP threshold is based at least in part on the first traffic priority and a second traffic priority associated with the second sidelink transmission.

Aspect 6: The method of aspect 5, further comprising: receiving a control message that indicates a plurality of RSRP thresholds each associated with a respective pair of first and second traffic priorities, wherein the respective traffic priority pairs comprise a first traffic priority associated with the first resources and a second traffic priority associated with the second resources; and selecting the RSRP threshold from the plurality of RSRP thresholds based at least in part on the RSRP threshold corresponding to a pair of the first traffic priority associated with the first sidelink transmission and the second traffic priority associated with the second sidelink transmission.

Aspect 7: The method of aspect 1, wherein the one or more parameters indicated via the SCI comprise a first traffic priority associated with the first sidelink transmission, the method further comprising: transmitting the second sidelink transmission based at least in part on a second traffic priority associated with the second sidelink transmission being greater than the first traffic priority associated with the first sidelink transmission.

Aspect 8: The method of aspect 1, wherein the one or more parameters indicated via the SCI comprise a first zone ID associated with the first sidelink transmission, the method further comprising: comparing the first zone ID associated with the first sidelink transmission with a second zone ID of the first UE, the first zone ID associated with a second UE that transmits the first sidelink transmission, a third UE that receives the first sidelink transmission, or both, wherein the determining whether to transmit the second sidelink transmission is based at least in part on the comparing.

Aspect 9: The method of aspect 8, further comprising: transmitting the second sidelink transmission based at least in part on the first zone ID being different than the second zone ID.

Aspect 10: The method of any of aspects 1 through 9, further comprising: performing an LBT procedure, wherein the monitoring for the SCI is based at least in part on a success of the LBT procedure.

Aspect 11: The method of any of aspects 1 through 10, wherein the monitoring for the SCI comprises: monitoring for the SCI within a first set of RBs that are overlapping, partially overlapping, or non-overlapping in a frequency domain with a second set of RBs allocated for the second sidelink transmission.

Aspect 12: The method of any of aspects 1 through 11, wherein the SCI comprises first stage SCI, second stage SCI, or both.

Aspect 13: A method for wireless communication implemented by a first UE, comprising: monitoring one or more symbols in a slot for a DMRS associated with a first sidelink transmission corresponding to first resources that span a duration of the slot; measuring a signal strength of the DMRS based at least in part on the monitoring; and determining, based at least in part on the measured signal strength of the DMRS, whether to transmit a second sidelink transmission having a duration that is less than a first duration of the first sidelink transmission, wherein the second sidelink transmission corresponds to second resources in the slot that are offset in time from a starting symbol of the first sidelink transmission.

Aspect 14: The method of aspect 13, further comprising: comparing the measured signal strength with a signal strength threshold, wherein determining whether to transmit the second sidelink transmission is based at least in part on the comparing.

Aspect 15: The method of aspect 14, further comprising: transmitting the second sidelink transmission based at least in part on the measured signal strength being less than the signal strength threshold.

Aspect 16: The method of any of aspects 14 through 15, further comprising: selecting, from a plurality of signal strength thresholds each associated with a respective traffic priority, the signal strength threshold based at least in part on a traffic priority of the second sidelink transmission.

Aspect 17: The method of any of aspects 13 through 16, wherein the monitoring comprises: monitoring for the DMRS within a first set of RBs that are overlapping, partially overlapping, or non-overlapping in a frequency domain with a second set of RBs allocated for the second sidelink transmission.

Aspect 18: The method of aspect 17, further comprising: receiving the DMRS via the first set of RBs, wherein the DMRS indicates a third set of RBs allocated for the first sidelink transmission, the third set of RBs overlapping, partially overlapping, or non-overlapping in the frequency domain with the second set of RBs allocated for the second sidelink transmission.

Aspect 19: The method of any of aspects 13 through 18, wherein the monitoring comprises: monitoring PSCCH resources for the DMRS, wherein the DMRS comprises a preamble for the first sidelink transmission.

Aspect 20: The method of any of aspects 13 through 19, wherein the signal strength comprises an RSRP.

Aspect 21: A method for wireless communication implemented by a first UE, comprising: measuring a signal strength of sidelink signaling received across a plurality of adjacent subbands in a frequency domain and within a first set of one or more symbols in a beginning portion of a slot, the sidelink signaling received via a sidelink communication link; comparing the signal strength of the sidelink signaling with a signal strength threshold; and determining, based at least in part on the comparing, whether to transmit a sidelink transmission via a first subband of the plurality of adjacent subbands, the sidelink transmission corresponding to resources in the slot that are offset in time from the first set of one or more symbols in the slot.

Aspect 22: The method of aspect 21, further comprising: transmitting the sidelink transmission based at least in part on the signal strength of the sidelink signaling being less than the signal strength threshold.

Aspect 23: The method of any of aspects 21 through 22, wherein the comparing comprises: comparing a respective signal strength of the sidelink signaling received via each subband of the plurality of adjacent subbands with a respective signal strength threshold of a plurality of signal strength thresholds, wherein signal strength thresholds associated with each subband of the plurality of adjacent subbands are different.

Aspect 24: The method of aspect 23, wherein a value of a first signal strength threshold associated with the first subband via which the sidelink transmission is scheduled is less than values of second signal strength thresholds of the plurality of signal strength thresholds.

Aspect 25: The method of any of aspects 21 through 24, further comprising: performing a first LBT procedure for channel access; and performing a second LBT procedure based at least in part on a success of the first LBT procedure, wherein the measuring the signal strength of the sidelink signaling is based at least in part on performing the second LBT procedure.

Aspect 26: The method of any of aspects 21 through 25, wherein the signal strength corresponds to RSSI and the signal strength threshold corresponds to an energy detection threshold.

Aspect 27: An apparatus for wireless communication implemented by a first UE, comprising a processor; and memory coupled with the processor, wherein the memory comprises instructions executable by the processor to cause the apparatus to perform a method of any of aspects 1 through 12.

Aspect 28: An apparatus for wireless communication implemented by a first UE, comprising at least one means for performing a method of any of aspects 1 through 12.

Aspect 29: A non-transitory computer-readable medium storing code for wireless communication implemented by a first UE, the code comprising instructions executable by a processor to perform a method of any of aspects 1 through 12.

Aspect 30: An apparatus for wireless communication implemented by a first UE, comprising a processor; and memory coupled with the processor, wherein the memory comprises instructions executable by the processor to cause the apparatus to perform a method of any of aspects 13 through 20.

Aspect 31: An apparatus for wireless communication implemented by a first UE, comprising at least one means for performing a method of any of aspects 13 through 20.

Aspect 32: A non-transitory computer-readable medium storing code for wireless communication implemented by a first UE, the code comprising instructions executable by a processor to perform a method of any of aspects 13 through 20.

Aspect 33: An apparatus for wireless communication implemented by a first UE, comprising a processor; and memory coupled with the processor, wherein the memory comprises instructions executable by the processor to cause the apparatus to perform a method of any of aspects 21 through 26.

Aspect 34: An apparatus for wireless communication implemented by a first UE, comprising at least one means for performing a method of any of aspects 21 through 26.

Aspect 35: A non-transitory computer-readable medium storing code for wireless communication implemented by a first UE, the code comprising instructions executable by a processor to perform a method of any of aspects 21 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. In one aspect, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. In one aspect, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. In one aspect, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. In one aspect, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication implemented by a first user equipment (UE), comprising:
    a processor; and
    memory coupled with the processor, wherein the memory comprises instructions executable by the processor to cause the apparatus to:
        monitor, during a slot, for sidelink control information associated with a first sidelink transmission corresponding to first resources that span a duration of the slot;
        receive the sidelink control information based at least in part on the monitoring, the sidelink control information indicating one or more parameters associated with the first sidelink transmission;
        determine, based at least in part on the one or more parameters associated with the first sidelink transmission, whether to transmit a second sidelink transmission having a duration that is less than a first duration of the first sidelink transmission, wherein the second sidelink transmission corresponds to second resources in the slot that are offset in time from a starting symbol of the first sidelink transmission,
        measure a reference signal received power associated with the sidelink control information;
        compare the measured reference signal received power with a reference signal received power threshold, wherein determining whether to transmit the second sidelink transmission is based at least in part on the comparing, wherein the one or more parameters indicated via the sidelink control information comprise a first traffic priority associated with the first sidelink transmission, and a value of the reference signal received power threshold is based at least in part on the first traffic priority and a second traffic priority associated with the second sidelink transmission;
        receive a control message that indicates a plurality of reference signal received power thresholds each associated with a respective pair of first and second traffic priorities, wherein the respective traffic priority pairs comprise a first traffic priority associated with the first resources and a second traffic priority associated with the second resources; and
        select the reference signal received power threshold from the plurality of reference signal received power thresholds based at least in part on the reference signal received power threshold corresponding to a pair of the first traffic priority associated with the first sidelink transmission and the second traffic priority associated with the second sidelink transmission.

2. The apparatus of claim 1, wherein the instructions are further executable by the processor to cause the apparatus to:
    transmit the second sidelink transmission based at least in part on the measured reference signal received power being less than the reference signal received power threshold.

3. The apparatus of claim 1, wherein the instructions are further executable by the processor to cause the apparatus to:
    transmit the second sidelink transmission based at least in part on a second traffic priority associated with the second sidelink transmission being greater than the first traffic priority associated with the first sidelink transmission.

4. The apparatus of claim 1, wherein the instructions are further executable by the processor to cause the apparatus to:
    perform a listen-before-talk procedure, wherein the monitoring for the sidelink control information is based at least in part on a success of the listen-before-talk procedure.

5. The apparatus of claim 1, wherein the instructions to monitor for the sidelink control information are executable by the processor to cause the apparatus to:
    monitor for the sidelink control information within a first set of resource blocks that are overlapping, partially overlapping, or non-overlapping in a frequency domain with a second set of resource blocks allocated for the second sidelink transmission.

6. The apparatus of claim 1, wherein the sidelink control information comprises first stage sidelink control information, second stage sidelink control information, or both.

7. A method for wireless communication implemented by a first user equipment (UE), comprising:
    monitoring, during a slot, for sidelink control information associated with a first sidelink transmission corresponding to first resources that span a duration of the slot;
    receiving the sidelink control information based at least in part on the monitoring, the sidelink control information indicating one or more parameters associated with the first sidelink transmission;
    determining, based at least in part on the one or more parameters associated with the first sidelink transmission, whether to transmit a second sidelink transmission having a duration that is less than a first duration of the first sidelink transmission, wherein the second sidelink transmission corresponds to second resources in the slot that are offset in time from a starting symbol of the first sidelink transmission;

measuring a reference signal received power associated with the sidelink control information;

comparing the measured reference signal received power with a reference signal received power threshold, wherein determining whether to transmit the second sidelink transmission is based at least in part on the comparing, wherein the one or more parameters indicated via the sidelink control information comprise a first traffic priority associated with the first sidelink transmission; and a value of the reference signal received power threshold is based at least in part on the first traffic priority and a second traffic priority associated with the second sidelink transmission;

receiving a control message that indicates a plurality of reference signal received power thresholds each associated with a respective pair of first and second traffic priorities, wherein the respective traffic priority pairs comprise a first traffic priority associated with the first resources and a second traffic priority associated with the second resources; and selecting the reference signal received power threshold from the plurality of reference signal received power thresholds based at least in part on the reference signal received power threshold corresponding to a pair of the first traffic priority associated with the first sidelink transmission and the second traffic priority associated with the second sidelink transmission.

8. The method of claim 7, further comprising:
transmitting the second sidelink transmission based at least in part on the measured reference signal received power being less than the reference signal received power threshold.

9. The method of claim 7, further comprising:
transmitting the second sidelink transmission based at least in part on a second traffic priority associated with the second sidelink transmission being greater than the first traffic priority associated with the first sidelink transmission.

10. The method of claim 7, further comprising:
performing a listen-before-talk procedure, wherein the monitoring for the sidelink control information is based at least in part on a success of the listen-before-talk procedure.

11. The method of claim 7, wherein monitoring for the sidelink control information comprises:
monitoring for the sidelink control information within a first set of resource blocks that are overlapping, partially overlapping, or non-overlapping in a frequency domain with a second set of resource blocks allocated for the second sidelink transmission.

12. The method of claim 7, wherein the sidelink control information comprises first stage sidelink control information, second stage sidelink control information, or both.

* * * * *